(12) United States Patent
Gupta et al.

(10) Patent No.: US 12,475,390 B2
(45) Date of Patent: Nov. 18, 2025

(54) ARTIFICIAL INTELLIGENCE SYSTEM PROVIDING INTERACTIVE MODEL INTERPRETATION AND ENHANCEMENT TOOLS

(71) Applicant: Amazon Technologies, Inc., Seattle, WA (US)

(72) Inventors: Shikhar Gupta, Seattle, WA (US); Shriram Venkataramana, Seattle, WA (US); Sri Kaushik Pavani, Redmond, WA (US); Sunny Dasgupta, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/645,257

(22) Filed: Apr. 24, 2024

(65) Prior Publication Data
US 2024/0273389 A1    Aug. 15, 2024

Related U.S. Application Data

(63) Continuation of application No. 18/305,278, filed on Apr. 21, 2023, now Pat. No. 11,995,573, which is a continuation of application No. 16/742,746, filed on Jan. 14, 2020, now Pat. No. 11,669,753.

(51) Int. Cl.
| | | |
|---|---|---|
| G06F 7/00 | (2006.01) | |
| G06F 16/28 | (2019.01) | |
| G06N 5/04 | (2023.01) | |
| G06N 20/00 | (2019.01) | |

(52) U.S. Cl.
CPC ............. *G06N 5/04* (2013.01); *G06F 16/285* (2019.01); *G06N 20/00* (2019.01)

(58) Field of Classification Search
CPC ........ G06F 16/35; G06F 16/36; G06F 16/285; G06F 16/322; G06F 16/258; G06F 16/906; G06F 16/90344; G06F 16/27; G06F 16/22; G06F 16/288; G06N 5/04; G06N 20/00
See application file for complete search history.

(56) References Cited

U.S. PATENT DOCUMENTS

| | | |
|---|---|---|
| 7,971,054 B1 | 6/2011 | Boisjolie |
| 8,086,549 B2 | 12/2011 | Qi et al. |
| 9,336,483 B1 | 5/2016 | Abeysooriya |
| (Continued) | | |

FOREIGN PATENT DOCUMENTS

| | | |
|---|---|---|
| WO | 2017032775 | 3/2017 |

OTHER PUBLICATIONS

Erik Strumbelj, et al., "Explaining prediction models and individual predictions with eature contributions," Springer DOI. 10.1007/s10115-013-0679-x, 2014, pp. 647-665.
(Continued)

*Primary Examiner* — Mohammad A Sana
(74) *Attorney, Agent, or Firm* — Robert C. Kowert; Kowert, Hood, Munyon, Rankin & Goetzel, P.C.

(57) ABSTRACT

An interactive interpretation session with respect to a first version of a machine learning model is initiated. In the session, indications of factors contributing to a prediction decision are provided, as well indications of candidate model enhancement actions. In response to received input, an enhancement action is implemented to obtain a second version of the model. The second version of the model is stored.

20 Claims, 11 Drawing Sheets

(56) References Cited

U.S. PATENT DOCUMENTS

| | | | |
|---|---|---|---|
| 9,400,639 | B2 | 7/2016 | Kalai et al. |
| 9,430,766 | B1 | 8/2016 | Kraft |
| 10,116,680 | B1 | 10/2018 | Han |
| 10,417,350 | B1 | 9/2019 | Mohamed et al. |
| 10,824,959 | B1* | 11/2020 | Chatterjee .............. G06N 20/00 |
| 11,120,364 | B1 | 9/2021 | Gokalp et al. |
| 11,170,309 | B1 | 11/2021 | Stefani |
| 11,475,214 | B1 | 10/2022 | Chacko |
| 11,593,700 | B1 | 2/2023 | Ansari et al. |
| 11,669,753 | B1 | 6/2023 | Gupta et al. |
| 11,755,947 | B1 | 9/2023 | Hernandez Munuera |
| 11,868,436 | B1 | 1/2024 | Gokalp et al. |
| 11,875,230 | B1 | 1/2024 | Gokalp |
| 11,995,573 | B2 | 5/2024 | Gupta et al. |
| 2002/0159642 | A1 | 10/2002 | Whitney |
| 2004/0143602 | A1 | 7/2004 | Ruiz et al. |
| 2004/0183799 | A1 | 9/2004 | Hao |
| 2006/0160774 | A1 | 7/2006 | Parker |
| 2009/0252404 | A1 | 10/2009 | Lecerf |
| 2012/0095943 | A1 | 4/2012 | Yankov et al. |
| 2013/0132001 | A1 | 5/2013 | Yacout et al. |
| 2014/0156665 | A1 | 6/2014 | Kraley |
| 2014/0229164 | A1 | 8/2014 | Martens et al. |
| 2015/0019463 | A1 | 1/2015 | Simard |
| 2015/0254555 | A1 | 9/2015 | Williams, Jr. et al. |
| 2015/0254766 | A1 | 9/2015 | Abramowitz |
| 2015/0379429 | A1 | 12/2015 | Lee |
| 2016/0162802 | A1 | 6/2016 | Chickering et al. |
| 2016/0180557 | A1 | 6/2016 | Yousaf et al. |
| 2017/0039213 | A1 | 2/2017 | Rind |
| 2017/0054592 | A1 | 2/2017 | Olrog |
| 2017/0102681 | A1 | 4/2017 | Verhoeven |
| 2017/0250915 | A1 | 8/2017 | Long, III |
| 2019/0236478 | A1 | 8/2019 | Wu et al. |
| 2019/0244113 | A1 | 8/2019 | Ramos et al. |
| 2019/0370397 | A1 | 12/2019 | Kummamuru |
| 2020/0065863 | A1 | 2/2020 | Hong et al. |
| 2020/0104753 | A1 | 4/2020 | Demiralp et al. |
| 2020/0111111 | A1* | 4/2020 | Suzuki .............. G06Q 30/0205 |
| 2020/0193842 | A1* | 6/2020 | Mikami .................... B64F 1/36 |
| 2020/0388358 | A1 | 12/2020 | Chen et al. |
| 2021/0049512 | A1 | 2/2021 | Chatterjee et al. |
| 2021/0056355 | A1* | 2/2021 | Luss ...................... G06V 10/82 |
| 2021/0097412 | A1* | 4/2021 | Iizuka .................... G02C 7/028 |
| 2021/0133655 | A1* | 5/2021 | Suemitsu ............. G06Q 10/087 |
| 2022/0366463 | A1 | 11/2022 | Gobel |
| 2023/0252325 | A1 | 8/2023 | Gupta et al. |
| 2023/0376857 | A1 | 11/2023 | Gokalp |

OTHER PUBLICATIONS

Jenna Burrell, et al., "How the machine "thinks": Understanding opacity in machine learning algorithms," Big Data Society, Original Research Article, 2016, pp. 1-12.

Daniel Smilkov, et al., "SmoothGrad: removing noise by adding noise", arXiv: 1706.03825v1, Jun. 12, 2017, pp. 10.

Unknown, "Andosa/treeinterpreter", Retrieved from https://github.com/andosa/treeinterpreter on Dec. 30, 2019, pp. 3.

Tim Bock, "How to Interpret Logistic Regression Coefficients", Retrieved from https://www.displayr.com/how-to-interpret-logistic-regression-coefficients/ on Dec. 30, 2019, pp. 8.

Unknown, "Interpreting Random Forests—Diving into data", retrieved from https://blog.datadive.net/interpreting-random-forests/ on Dec. 30, 2019, pp. 16.

Edward Ma, "Interpreting your deep learning model by Shap", Retrieved from https://towardsdatascience.com/interpreting-your-deep-learning-model-by-shap-e69be2b47893 on Dec. 10, 2019, pp. 10.

Marco Tulio Ribeiro, et al, "Local Interpretable Model-Agnostic Explanations (LIME): An Introduction", Retrieved from https://www.oreilly.com/learning/introduction-to-local-interpretable-model-agnostic-explanations-lime on Dec. 10, 2019, pp. 17.

Sebastian Lapushkin, et al, "LRP Toolbox for Artificial Neural Networks 1.2.0—Manual", 2016, pp. 20.

Unknown, "Simplifying Decision Tress Interpretability with Python & Scikit-learn", Retrieved from https://www.kdnuggets.com/2017/05/simplifying-decision-tree-interpretation-decision-rules-python.html on Dec. 30, 2019, pp. 12.

Gregory Druck et al "Active Learning by Labeling Features" (Proceedings of the 2009 Conference on Empirical Methods in Natural Language Processing.) Aug. 2009, pp. 81-90.

Nicholas Roy et al "Toward Optimal Active Learning through Monte Carlo Estimation of Error Reduction" pp. 1-8.

Burr Settles "Active Learning Literature Survey" Jan. 26, 2010, pp. 1-67.

Burr Settles et al "Behavioral Factors in Interactive Training of Text Classifiers" pp. 1-5.

Burr Settles et al "Multiple-Instance Active Learning" (Appears in Advances in Neural Information Processing Systems), 2008, pp. 1289-1296.

Burr Settles et al "Active Learning with Real Annotation Costs" (Appears in Proceedings of the NIPS Workshop on Cost-Sensitive Learning), 2008, pp. 1-10.

Amazon Web Services, "Amazon Machine Learning—Developer Guide", Updated Aug. 2, 2016, pp. 1-39.

"Baesens, et al. ""Using Neural Network Rule Extraction and Decision Tables for Credit-Risk Evaluation,"" Management Science @ 2003 Informs, vol. 49, No. 3, Mar. 2003 pp. 312-329.".

Swartout, et al., "Explanations in knowledge systems: design for explainable expert systems," IEEE, pp. 58-64, 1991.

Rakesh Agrawal, et al., "Fast Algorithms for Mining Association Rules", In the Proceedings of the 20th VLDB Conference, 1994, pp. 1-13.

Wikipedia, "C4.5 algorithm", Retrieved from URL: https://en.wikipedia.org/wiki/C4.5_algorithm on Dec. 20, 2015, pp. 1-4.

Wenmin Li, et al., "CMAR: Accurate and Efficient Classification Based on Multiple Class-Association Rules*", In Data Mining, ICDM 2001, Proceedings IEEE International Conference, 2001, pp. 369-376.

Wikipedia, "CN2 algorithm", Retrieved from URL: https://en.wikipedia.org/wiki/CN2_algorithm on Dec. 20, 2015, pp. 1-2.

Peter Clark, et al., "The CN2 Induction Algorithm", Machine Learning 3, 1989, pp. 261-28, Kluwer Academic Publishers, The Netherlands.

Florian Verhein, "Frequent Pattern Growth (FP-Growth) Algorithm An Introduction", School of Information Studies, 2008, pp. 1-10, The University of Sydney, Australia.

"The ID3 Algorithm", Retrieved from URL: http://www.cise.ufl.edu/~ddd/cap6635/Fall97/Shortpapers/2.htm on Dec. 20, 2015, pp. 1-7.

"Is See5/C5.0 Better Than C4.5?", Retrieved from URL: http://www.rulequest.com/see5comparison.html on Dec. 20, 2015, pp. 1-4.

Pratik Jawanpuria, et al., "Generalized Hierarchical Kernel Learning" Journal of Machine Learning Research 16, 2015, pp. 617-652.

Xiaoxin Yin, et al., "CPAR: Classification based on Predictive Association Rules*", In the Proceedings of the third SIAM International Conference of Data Mining, 2003, pp. 331-335.

William W. Cohen, et al., "A Simple, Fast, and Effective Rule Learner", American Association for Artificial Intelligence, 1999, pp. 1-8.

Ramprasaath R. Selvaraju et al. "GRAD-CAM: Visual Explanations from Deep Networks via Gradient-based Localization", dated Dec. 3, 2019, pp. 1-23.

Mukund Sundararajan et al, "Axiomatic Attribution for Deep Networks", dated Jun. 13, 2017, pp. 1-11.

Marco Tulio Ribeiro et al, "Anchors: High-Precision Model-Agnostic Explanations", pp. 1-9.

U.S. Appl. No. 17/199,213, filed Mar. 11, 2021, Rahul Suresh.

Quindlen, "Data-Driven Methods for Statistical Verification of Uncertain Nonlinear Systems," Doctoral Thesis, Massachusetts Institute of Technology, 2018, pp. 1-290.

Dzyuba, "Mine, Interact, Learn, Repeat: Interactive Pattern-Based Data Exploration," Doctoral Thesis, Arenberg Doctoral School, 2017, pp. 1-162.

(56) References Cited

OTHER PUBLICATIONS

Depenau, "Automated Design of Neural Network Architecture for classification," Doctoral Thesis, Aarhus University, 1995, pp. 1-148.

Towell, et al., "Extracting Refind Rules from Knowledge-Based Neural Networks," Machine Learning, 13, pp. 71-101, 1993 Kluwer Academic Publishers.

Baehrens, et al. "How to Explain Individual Classification Decisions," Journal of Machine Learning Reaseaarch 11, 2010, pp. 1803-1831, 2020.

"Mark W. Craven, et al., ""Using Sampling and Queries to Extract Rules from Trained Neural Networks,"" Proceedings of the Eleventh International Conference, Rutgers University, New Brunswick, NJ, Jul. 10-13, 19941994, pp. 37-45.".

Gerald Tesauro, Online Resource Allocation Using Decompositional Reinforcement Learning, Copyright 2005, American Association for Artificial Intelligence, 2005, pp. 1-6.

\* cited by examiner

Interactive interface 501

Classifier name 502

Sort by: Feature order 504    Feature types to include: ☑ [int(2)] ☑ [float(2)] ☑ [string(12)] 506    Feature search term entry form 508

Numeric features (4) 512

| Name 514 | Count 516 | Missing 518 | Mean 520 | StdDev 522 | Min 524 | Median 526 | Max 520 | Show chart(s) for 522 |
|---|---|---|---|---|---|---|---|---|
| <attr1> | | | | | | | | |
| <attr7> | | | | | | | | |
| <attr9> | | | | | | | | |
| <attr12> | | | | | | | | |

Non-numeric features (12) 532

| Name 534 | Count 536 | Missing 538 | Unique 540 | Top 542 | Top freq 544 | AvgLen 546 | Show charts for 550 |
|---|---|---|---|---|---|---|---|
| <attr2> | | | | | | | |
| <attr3> | | | | | | | |
| <attr4> | | | | | | | |
| <attr12> | | | | | | | |

| Classifier name: | 602 | Class name: | 603 | | |
|---|---|---|---|---|---|
| Filter type: | ☑ [All records] ☐ [Confusion matrix quadrant] ☐ [Data cluster] ☐ [Custom filter] 606 | | | | |

Class inclusion aggregated contributing factors 612

| Name-and-value 614 | #Containing records 616 | Weight modification action 618 | | |
|---|---|---|---|---|
| <attr1 == val1> | | + | − | X |
| <attr7 == val2> | | + | − | X |
| <attr9 == val3> | | + | − | X |
| <attr12 == val4> | | + | − | X |

Class exclusion aggregated contributing factors 622

| Name-and-value 624 | #Containing records 626 | Weight modification action 628 | | |
|---|---|---|---|---|
| <attr1 == val6> | | + | − | X |
| <attr2 == val5> | | + | − | X |
| <attr10 == val7> | | + | − | X |
| <attr10 == val8> | | + | − | X |

Feature search entry form 608

Interactive interface 601

*FIG. 6*

ARTIFICIAL INTELLIGENCE SYSTEM PROVIDING INTERACTIVE MODEL INTERPRETATION AND ENHANCEMENT TOOLS

This application is a continuation of U.S. patent application Ser. No. 18/305,278, filed Apr. 21, 2023, which is a continuation of U.S. patent application Ser. No. 16/742,746, filed Jan. 14, 2020, now U.S. Pat. No. 11,669,753, which are hereby incorporated by reference herein in their entirety.

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Classification, or the task of identifying to which of a set of categories (sub-populations) a new observation belongs, on the basis of learning from a training set of data containing observations or examples whose category membership is known, is one of the most useful and often-used categories of machine learning techniques. A number of algorithms for classification of different levels of sophistication have been developed over the years, including, for example, linear classifiers such as logistic regression algorithms, Bayesian classifiers, support vector machines, decision-tree based algorithms, neural network-based algorithms and the like.

Many machine learning models, including classification models, are hard for non-experts to understand or debug. For example, users may be presented with results indicating the class into which a particular data record has been placed, without an accompanying explanation. Because of such opaqueness, especially in scenarios in which the model's results appear unexpected or non-intuitive, users may not be able to trust the model, even if the model satisfies technical criteria being used to terminate model training. Furthermore, in situations in which the model can be improved to better match the expectations of the users, there is often no straightforward technique available for non-expert users to initiate such improvements.

BRIEF DESCRIPTION OF DRAWINGS

FIG. 5 illustrates an example interactive interface which may be employed to present feature-level statistical distribution information for a machine learning model, according to at least some embodiments.

FIG. 6 illustrates an example interactive interface which may be employed to enable users to change weights assigned to prediction contribution factors of a machine learning model, according to at least some embodiments.

Figure 1:
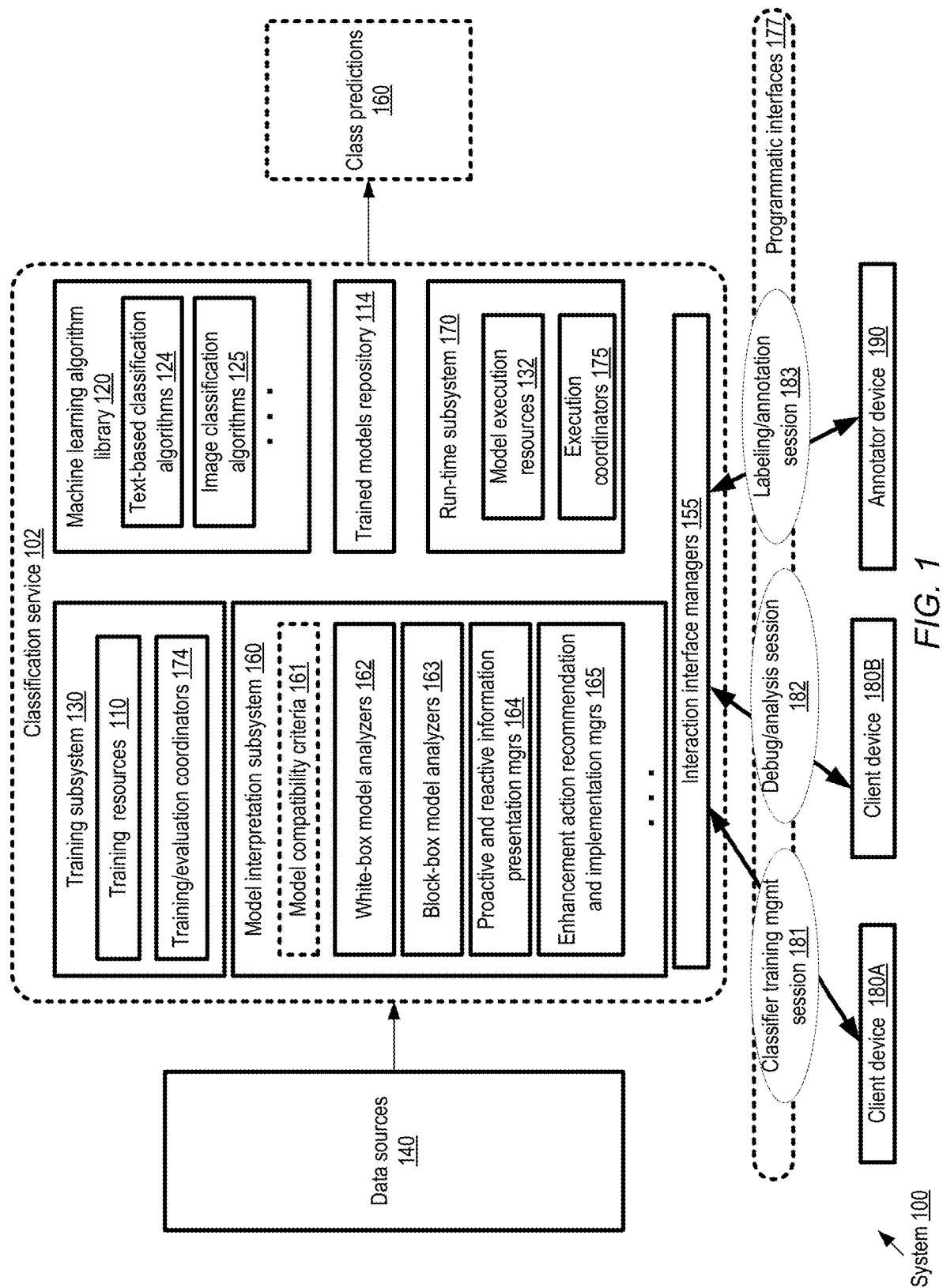
FIG. 1 illustrates an example system environment in which a classification service which provides interfaces to enable non-expert users to easily interpret and enhance machine learning models may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for providing intuitive interfaces and tools to enable the interpretation and enhancement of machine learning models such as classifiers. The algorithms and techniques described herein may be especially beneficial in scenarios in which individuals who are not machine learning experts, such as business users, wish to develop and use machine learning models. For example, non-expert users may be able to answer questions similar to the following using the presented techniques: "Has the model learned my objectives?", "Why has the model classified a record the way it has?" and "What simple steps can I take to align the model more closely with my objectives?" A number of easy-to-use programmatic interfaces may be provided in various embodiments to enable users (e.g., clients of a network-accessible machine learning service or classification service, or users of a tool provided by such a service) to gain insights into the learning progress of a model. Such insights may be provided during or after the training phase of a model in some embodiments, and may allow the users to guide the subsequent training or re-training of the model to better achieve the goals of the modeling exercise. Interface elements may be provided to enable users to initiate various types of model enhancement actions, based on the presented data regarding the current state of the model in various embodiments. While much of the following description presents classification models (also referred to as classifiers) as the example machine learning model type for which interpretation information is provided, techniques similar to those introduced herein may be used with equal success for other types of machine learning models in at least some embodiments, such as regression models, navigation models for autonomous robots and the like. To further simplify the presentation, for the most part the model interpretation techniques are described here as being implemented by a network-accessible classification service of a provider network or cloud computing environment, although the techniques may also be implemented using a standalone tool (e.g., a tool which can be downloaded and run at various types of computing devices without necessarily communicating with a network-accessible service) in at least one embodiment.

As one skilled in the art will appreciate in light of this disclosure, certain embodiments may be capable of achieving various advantages, including some or all of the following: (a) reducing the overall amount of CPU, memory, networking and storage resources that have to be utilized for developing machine learning models of a desired quality level, e.g., by enabling enhancements to the training of the model early on in the training phase; (b) substantially enhancing the user experience for individuals (including individuals who are not data scientists or experts in machine learning techniques) on whose behalf machine learning models are being generated, e.g., by providing explanatory data at various stages of model development and use, simplifying the presentation of potentially complex combinations of metrics and analysis results, and/or (c) reducing the resources needed to generate labels for records to be included in model training sets, e.g., by enabling more intelligent selection of labeling candidate records based on the progress made by a model during training, and/or based on insights generated during the labeling process itself. In addition, the techniques described herein may also lead to an increase in the trust level or "buy-in" associated with machine learning models, by providing insights into the specific contributing factors that lead to the predictions of the models.

At a high level, in at least some embodiments the following kinds of operations may be performed by a classification service to support model interpretation and enhancement utilizing easy-to-use interfaces. A set of acceptance criteria or compatibility criteria may be defined by the classification service, indicating one or more conditions which a classification model has to satisfy in order for the service to establish interactive model interpretation sessions with users. Such criteria may, for example, indicate that the classification model has to support a set of application programmatic interfaces for model training and testing, that the classification model (and associated metadata such as hyper-parameter files, training set records, etc.) has to be packaged in the form of a software container of a particular type, and so on in different embodiments. A client may indicate or provide access to a classification model for which interactive interpretation sessions are desired in some embodiments. Access to one or more data sets of the model such as a training data set, a test data set, a data set used for auditing the model, and so on may also be provided in at least some embodiments. The data sets may each comprise a plurality of data records, with each record comprising a set of values for respective attributes. The attributes may comprise content of various data types in different embodiments—e.g., some combination of text, numeric values, categorical values, images, audio, video, and the like may be included in various records of the data sets. At least some of the records may be labeled (e.g., indicating the particular target class to which a given record belongs) in various embodiments. The attribute values, or versions of the attribute values which have been transformed for easier consumption by the model, may also be referred to as features in various embodiments.

If the model meets the acceptance/compatibility criteria, in various embodiments the classification service may begin analyzing the model and the data set(s) provided. Note that in some embodiments, the analysis may be performed in parallel with, or concurrently with, the training phase of the model; as such, the training of the model may not have been completed at the time that analysis for presenting information regarding the interpretation of model behavior is begun. Indeed, in some cases, the training procedure may be guided to a substantial extent based on the interpretation information provided—e.g., at least some of the records to be included in the training set may be selected based on the insights provided by the interpretation information, weights for various attributes of the training data records may be adjusted, new stop-words may be identified, and so on.

Using a first version of the classification model (e.g., a non-optimal or partially-trained version) and the data sets, a number of factors may be identified at different granularities which contribute to the decisions being made by that version of the model in some embodiments. Factors (e.g., specific input record attribute values or ranges) that contribute to numerous decisions may be aggregated to provide a "global" or high-level interpretation in various embodiments; details of the contributing factors for individual records may also be presented to clients of the classification service if desired in at least some embodiments. For example, the classification service may determine one or more aggregated contributing factors for including records in a particular target class (referred to as class inclusion factors) learned thus far by the first version of the classification model, as well as one or more aggregated contributing factors for excluding records in a particular target class (referred to as class exclusion factors) learned thus far by the first version. In an example toy scenario in which products of an inventory are being classified as hazardous or non-hazardous, words or phrases such as "explosive", "fire", "sharp", "high voltage", "choking", "keep away from children", etc., in the description attributes of the products may represent example aggregated contributing factors for inclusion in the hazardous class, while words or phrases such as "child-proof", "soft", "cuddly", "cute", and the like may represent example aggregated contributing factors for exclusion from the hazardous class. Any of a number of white-box model analysis techniques (e.g., techniques in which the internal data structures and parameters of the model are accessible to the classification service) and/or black-model analysis techniques (in which the internal details of the model remain hidden, but the inputs to the model may be perturbed to discover the relative importance of different input attribute values as contributory factors) may be employed to identify the contributory factors in various embodiments.

An interactive interpretation session may be initiated with a client of the service with respect to the first version of the model in various embodiments, e.g., in response to a programmatic request from a client. In some embodiments, an interactive model development and testing framework or toolset may be used by a client of the service for various machine learning models, and the interpretation functionality may be incorporated within such a more general framework or toolset. As such, in some embodiments, a client may not have to submit a request explicitly for an interpretation session; instead, at least a portion of the interpretation information may be provided proactively as the client interacts with the classification service to view the progress of the model training, to label or re-label training data records, to view current results of the model, and so on. The timing of the start of the interactive interpretation session, relative to the timing of the analysis operations which enable identification of aggregate or record-level contributing factors may vary in different embodiments—e.g., in some cases the analysis may have started before the session is initiated, in other cases the analysis may be started at the same time as the session, and in yet other cases the analysis may be started after the session is started.

In the interactive interpretation session, one or more interactive interface elements (e.g., panels of web-pages or graphical user interfaces with control elements usable for user-provided input) may be used to present indications of: (a) the aggregated contributing factors identified thus far by the classification service and (b) one or more candidate model enhancement actions identified by the classification service with respect to the current version or state of the model. Any of a number of different types of candidate model enhancement actions may be indicated in different embodiments, including for example modifying weights associated with various contributory factors identified, removing some input records, dealing with null or empty attributes in various ways, adding records to the input data set, changing hyper-parameter values and the like.

In response to input received via the interactive programmatic interfaces, at least a first candidate model enhancement action may be implemented to obtain a second version of the classification model in various embodiments. In at least one embodiment, the second version of the model may be stored. A result obtained using the second version may be presented to the client via the interactive programmatic interfaces in at least some embodiments, indicating the improvements (or lack of improvements, depending on the effectiveness of the changes) obtained from the second model with respect to one or more metrics or dimensions of interest.

At various stages of an interactive interpretation session, a client may be provided a respective view of individual records of the input data of the model (e.g., depending on the client's preferences and the stage of development/testing of the model, the training data set, the test/evaluation data set, an audit data set, and so on.) Such views, which may include representations of various attributes of the records, may for example be obtained in response to search requests, or in response to requests to browse portions of the data sets. In various embodiments, a client may also be provided information in one or more ways regarding record-level contributory factors to the prediction decisions which have been made regarding individual records (e.g., in addition to the more high-level aggregated contributory factors mentioned above). For example, in some embodiments, the natural language "description" attribute for a product represented by a data record may contain numerous words and phrases, and specific words or phrases of the description which contributed significantly to the inclusion of the record in a predicted target class may be presented along with statistics regarding other records whose descriptions also include the specific words or phrases. Options for model enhancement actions at the record-level may also be presented via interactive interfaces in at least some embodiments—e.g., a client may be able to indicate whether the ground-truth label for a particular record should be changed, whether some words in an attribute of the record should be added to the list of "stopwords" of the model, whether the record should be removed from further training iterations of the model, and so on.

According to at least one embodiment, a classification service or tool may present recommendations regarding specific model enhancement actions, either at the global/aggregated level or at the record level. For example, a client may be informed that a particular kinds of regularization-related hyper-parameter is currently being used for a model, and that using a different regularization-related hyper-parameter is recommended to reduce over-fitting or other problems which have been encountered with the model. In other examples of a recommended action, in one embodiment the service or tool may suggest that one or more attribute values (such as null or missing values) for a given attribute be eliminated from the set of attribute values being used to make predictions, or that a different loss function be chosen for the model than the one being used currently.

With regard to classification models, in at least some embodiments additional kinds of interpretation information may be provided. For example, a graphical representation of one or more elements of a confusion matrix of the classification model may be presented to clients. In the case of binary classification for example, the elements of a 2×2 confusion matrix includes true negatives, true positives, false negatives and false positives, and graphical representations of at least some individual records in each of the elements may be presented. The representations (e.g., icons such as circles, squares, etc., each corresponding to a given record) may be color-coded or shaded to indicate similarities detected among the records. For example, if two records R1 and R2 are shown as circles of the same dark red color among the true positives, but another record R3 is shown as a lighter red circle, this may indicate that (based on any of various similarity metrics computed by the classification service for various record pairs), R1 and R2 are more similar to each other than R1 is to R3 (or R2 is to R3). Furthermore, by clicking on the icons or representations of individual records such as R1, R2 or R3 in the above example, a client may obtain details regarding the attribute values of an individual record and other similar records identified by the classification service. If two records' attribute details appear to only differ in one or two words or tokens, and the two records are being placed into different classes by the model, the differing tokens may be identified as significant contributing factors in such a scenario.

A number of other types of data useful for interpreting model behavior may be provided in different embodiments, such as information regarding the distributions of various numeric and non-numeric attributes among different classes or entire data sets, information about the lengths of various text attributes in different classes, the positions of similar sub-images (e.g., groups of adjacent pixels) in different images or videos, and so on. Any of a number of different types of classification models may be analyzed and interpreted in various embodiments using the techniques described, such as text-based classifiers, image classifiers, multi-content-type classifiers and the like. The classifiers for which interpretation information is provided may include binary classifiers (with one label per class), multi-class classifiers (with one label per class), or multi-label classifiers in at least some embodiments. In at least some embodiments, as mentioned earlier, interpretation information pertaining to other types of models than classifiers, such as regression models, game-playing models, navigation decision-making models, language translation models, and the like may also or instead be provided using similar approaches.

Example System Environment

FIG. 1 illustrates an example system environment in which a classification service which provides interfaces to enable non-expert users to easily interpret and enhance machine learning models may be implemented, according to at least some embodiments. As shown, system 100 comprises resources and artifacts of a network-accessible classification service 102, as well as one or more data sources 140 from which records that are to be classified at the service 102 may be obtained. Such systems, at which classification and/or other machine learning techniques are implemented, may be termed artificial intelligence systems in some embodiments. The classification service 102 may implement a set of programmatic interfaces 177, such as one or more web-based consoles, graphical user interfaces, command-line tools, application programming interfaces (APIs), and the like, which may be used by several different types of users or clients of the classification service 102 to interact with the service. Some users may submit programmatic requests via interfaces 177 from client devices 180A (e.g., laptops, desktops, mobile computing devices and the like) in classifier training management sessions 181 to initiate and orchestrate the process of training of classification models for categorizing records obtained from the data sources 140. Other users such as data scientists and the like may establish debugging or analysis sessions 182 from client devices 180B as needed, for example using programmatic interfaces 177 to examine the progress being made during various iterations of a training algorithm, to debug potential problems associated with one or more classification algorithms, and so on. A third category of entities interacting with the classification service 102 may include annotators, responsible for labeling individual records and/or collections of records obtained from the data sources 140, e.g., to prepare or enhance training data sets for classification models. Such annotators may for example view descriptors of target classes (provided programmatically to the classification service by clients who wish to have classification models trained) and representations of data records obtained from data sources 140, submit search queries, provide labels, and perform other types of operations from annotator devices 190 (which may also include laptops, desktops, mobile computing devices and the like) during labeling/annotation sessions 183 in the depicted embodiment. Sessions of several different kinds may be conducted concurrently in at least some embodiments—e.g., one or more annotation sessions 183 may continue while a debug/analysis session 182 is underway.

In some embodiments, model interpretation information identified using the techniques discussed herein, and/or candidate model enhancement actions may be presented as part of any of the three kinds of interactive sessions 181, 182 and 183; as such, all the session types shown in FIG. 1 may be include at least some model interpretation aspects. Generally speaking, the messages transmitted to and from the classification service 102 may be processed by interaction interface managers 155, with internal messages corresponding to received requests being transmitted by the interface managers to other components of the service, and responses obtained from the internal components being transformed for presentation to the clients/users by the interface managers. Users who initiate and manage the model training procedure, debug/analyze models, and/or annotate records as needed may all be referred to generically as clients of the classification service herein.

The classification service 102 may include a training subsystem 130, a model interpretation subsystem 160, as well as a run-time subsystem 170 at which trained classification models may be run in the depicted embodiment. The components of the different subsystems may include combinations of hardware and software elements of one or more computing devices in various embodiments. A variety of algorithms may be included in a machine learning algorithm library 120 of the classification service 102, including for example text-based classification algorithms 124, image classification algorithms 125 and the like. One or more training and evaluation coordinators 174 (also referred to as model generators) implemented at a set of computing devices may utilize training resources 110 (e.g., compute engines including CPUs, GPUs and the like, as well as storage, memory and networking resources) to train classification models using algorithms from library 120 in the depicted embodiment. Once a classification model has been trained to a desired level of quality using algorithms from library 120, it may be stored in a repository 114 of trained models. Execution coordinators 175, implemented at one or more computing devices, may run trained versions of the models using model execution resources 132 to generate class predictions 160 with respect to various target classes in the depicted embodiment.

According to at least some embodiments, a client may initiate the training of one or more classification models using one or more classification algorithms 124 by submitting one or more model training requests via interfaces 177. The requests may indicate, for example, the data sources from which labeled and/or unlabeled data is to be obtained, descriptors of one or more target classes into which records of a particular data set are to be categorized, and so on. In at least one embodiment, a model training request may specify the particular algorithm(s) to be used; in other embodiments, a training/evaluation coordinator 174 may select the specific classification algorithm, e.g., based on the size of the data set, the anticipated extent of the skew in the data set, and/or various other factors. Either during or after the training of a given classification model, interactive interpretation sessions (managed with the help of subsystem 160) may be utilized by clients and/or annotators, e.g., to understand what has been learned by the model thus far, to view and initiate the execution of model enhancement actions (which may in at least some cases require re-training of the model), and so on.

The model interpretation subsystem 160 may comprise a number of subcomponents, which may be implemented using one or more computing devices in the depicted embodiment. Before interpretation sessions for a given model can be initiated, in at least some embodiments one or more operations may be performed to verify that the model meets compatibility criteria 161 established at (and at least in some cases provided to clients via programmatic interfaces 177 by) the classification service 102. In order to qualify for interpretation sessions, the model may for example have to support a set of APIs for training and/or testing, and/or the model and its metadata may have to be packaged in the form of a software container of a specified type in some embodiments. Furthermore, of a model whose training has already been begun is to be interpreted, in at least one embodiment the classification service 101 may require that at least a portion of the model's training data be made accessible as well.

In various embodiments, the interpretation subsystem 160 may obtain access to a version of a classification model for one or more target classes which is compatible with the criteria 161. Aggregated contributing factors learned by a particular version of the model with respect to at least some of the target classes may then be identified using any of a variety of techniques in different embodiments. One or more white-box model analyzers 162 and/or one or more black-box model analyzers 163 may be utilized at the classification service 102 in some embodiments to identify contributing factors, e.g., at both the record-level as well as the aggregate level. A white-box model may provide access to internal structural elements/components and parameters of the model, while a black-box model may not provide such access to internal model information. In some examples of white-box model analysis, weights learned within the model (e.g., weights learned in linear classifiers such as logistic regression classifiers) may be obtained and used to interpret the model. The magnitude of logistic regression coefficients may be indicative of the global or aggregated importance of corresponding features. For interpreting a particular prediction, element-wise multiplication of logistic regression coefficients with features computed on the data may be performed in some embodiments. For individual predictions, a tree interpreter library can be used to show which features lead to a particular prediction. In another example of white-box analysis performed for random forest models in some embodiments, the global importance of features may be deduced via feature importance plots. For decision tree models, each node of the tree represents a decision which can be interpreted visually, and aggregated interpretation of such models may involve combining the decision information corresponding to the nodes encountered along a path from the root to a leaf node of the tree. For models such as xgboost (a type of gradient-boosted decision tree model), the aggregated importance of various features may be obtained using feature importance plots. In some examples of black-box model analysis, e.g., for deep neural networks, input perturbation experiments may be conducted to determine which input attributes contribute to the model's predictions. For example, if removing/adding one or more words {W1} in an input text attribute results in significant changes in class predictions, {W1} may be identified as an important contribution factor. Gradient based methods, in which the gradient on the output is back-propagated to the input to determine feature importance, represents another example of black-box model analysis which can be applied to deep neural networks and the like. A black-box analysis algorithm called "layer-wise relevance propagation (LRP)" may be employed for some types of neural network-based classifiers. In the LRP algorithm, a classifier's prediction with respect to a given data point is explained by attributing relevance scores to respective components of the input. Other types of white-box model analysis and black-box model analysis may be employed in different embodiments.

During an interactive interpretation session via programmatic interfaces 177 (e.g., a session 181, 182 or 183), the aggregated contributing factors, record-level contributing factors, and/or a set of candidate model enhancement actions may be presented to a client. Some types of interpretation information and/or action-related information may be presented proactively, e.g., instead of being presented in response to specific client requests; other types of information may be presented reactively or in response to specific client requests in the depicted embodiment. The specifics of the information presented in the session, and/or the sequence in which the information is presented, may vary based on the feedback received from the client and/or based on preferences indicated by the client, and may be determined by proactive and reactive information presentation managers 164 in at least some embodiments.

In at least one embodiment, the interpretation subsystem 160 may provide recommendations regarding one or more candidate mode enhancement actions—e.g., several different possible actions may be ranked relative to one another by enhancement action recommendation and implementation managers 165, and the action that is likely to produce the greatest enhancement (relative to the estimated amount of re-training or other re-work required) may be recommended. If the client indicates that a particular model enhancement action presented via the interactive interfaces of the session is to be implemented, the action may be performed by the action implementation managers 165 in at least some embodiments. As a result of such actions, new versions of models may be generated and stored. Results achieved by implementing the actions (e.g., results obtained using the new versions) may be presented via interfaces 177 in various embodiments. A wide variety of candidate model enhancement actions may be presented via interfaces 177 in different embodiments, including but not limited to: (a) modifying a weight associated with a particular contributing factor or feature, (b) removing/re-labeling one or more records from an input data set, (c) adding one or more records to an input data set, or (d) changing one or more hyper-parameters of the classification model. For at least some models, summarized as well as detailed information on confusion matrices generated using the models may be presented, as discussed below in further detail.

In some embodiments, a client may provide access to a model trained externally (e.g., using resources which are not managed by the classification service), as long as it meets the compatibility criteria 161, and interactive interpretation sessions for such external models may be initiated by the classification service 102. In one embodiment, a downloadable tool for interpreting compatible classification models may be provided by the classification service 102, which can be run at computing devices chosen by clients, enabling interactive interpretation sessions to be implemented without requiring further ongoing communications with the classification service 102.

Interpretation assistance with regard to various types of classification models may be provided by service 102 in some embodiments, including for example text-based classifiers, image classifiers and multi-content-type classifiers (whose records may include text, image, video, audio and/or other types of attributes). Interpretation of binary classifiers, multi-class classifiers, and multi-label classifiers may all be handled with equal success in different embodiments. In at least one embodiments, similar interpretation sessions to those described with respect to FIG. 1 may be implemented for models other than classifiers—e.g., for regression models, navigation decisions models, game-playing models, and so on.

Methods for Model Interpretation and Enhancement

Figure 2:
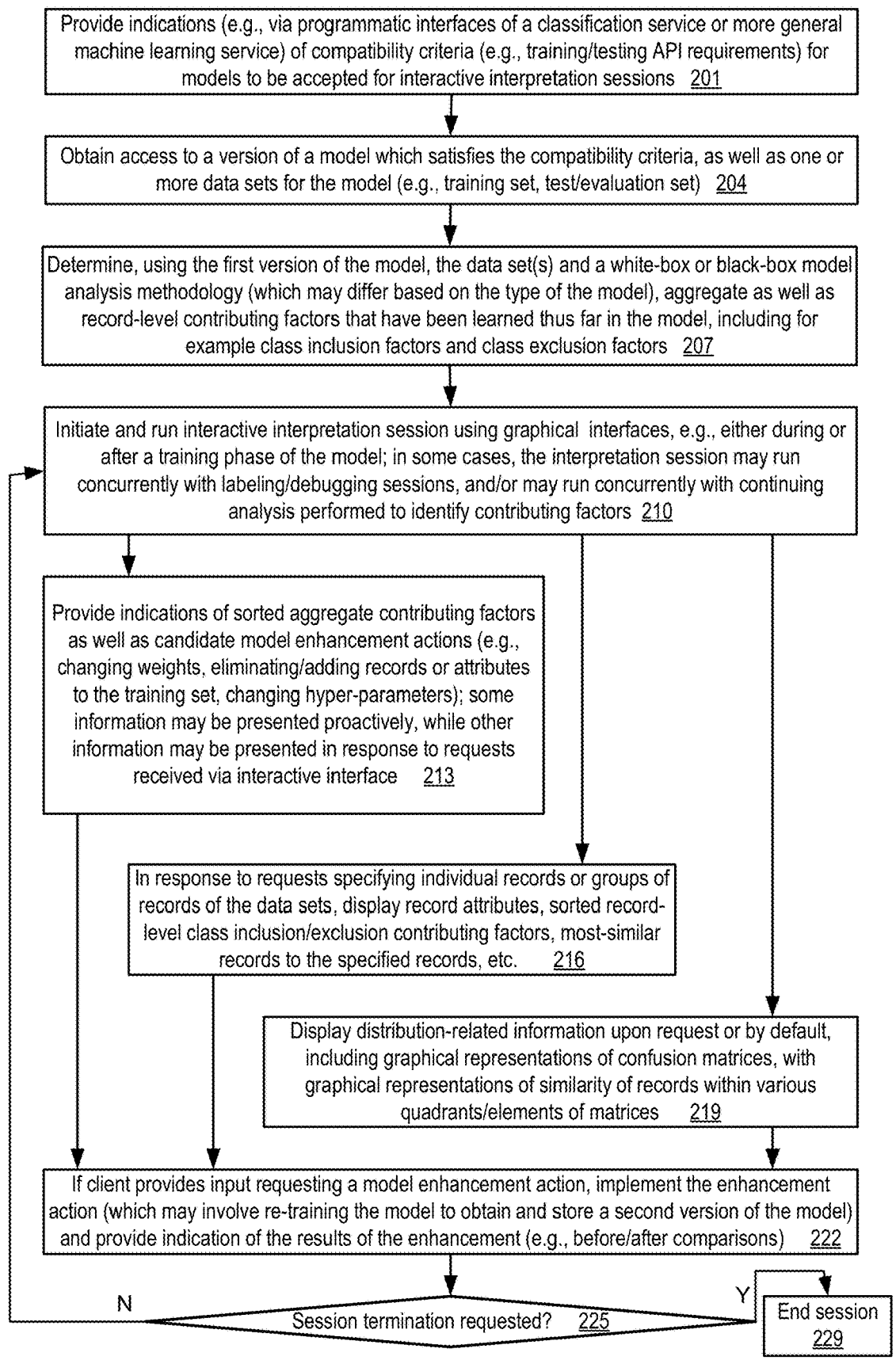
FIG. 2 is a flow diagram illustrating aspects of operations that may be performed to enable automated interpretation and enhancement of machine learning models, according to at least some embodiments.

FIG. 2 is a flow diagram illustrating aspects of operations that may be performed to enable automated interpretation and enhancement of machine learning models, according to at least some embodiments. As shown in element 201, an indication of one or more compatibility criteria for machine learning models to be accepted for interactive interpretation sessions may be provided, e.g., via programmatic interfaces to potential or actual clients of an interpretation tool, a classification service or a machine learning service. Any of several types of criteria may have to be satisfied for the service to be able to perform the types of analysis needed for the interpretation sessions, and to initiate model enhancement operations selected by clients during the sessions. For example, the models may have to support a specified set of application programming interfaces (APIs) for training or testing, models may have to be packaged in specified types of software containers or formats, or be written using one or more of a set of specified programming languages or machine learning frameworks in different embodiments. For models whose training has already been initiated (or completed), access to the training data sets and/or test data sets may be required for the interactive interpretation sessions in at least some embodiments. In some embodiments, the interpretation sessions may be established by or at the same classification service or machine learning service which was used to build the model; in other embodiments, at least some models which are generated using resources other than those of the classification service or machine learning service may be analyzed and explored using sessions set up with the help of the service. In at least some embodiments, a standalone tool or set of tools, which may for example be downloaded and run at a computing device selected by a client, may be employed for interpretation sessions with a model that satisfies the compatibility criteria.

Access to a version of a model which satisfies the compatibility criteria may be obtained at the service (element 204) in various embodiments, along with access to one or more data sets of the model such as the training or test/evaluation data sets. In some embodiments, one or more compatibility tests may be run at the service to verify that the model meets the criteria. In some embodiments, the access to the model may be obtained during the training of the model; in other embodiments, a model whose training has been completed may be accessed.

Using the version of the model and the data sets and a white-box or black-box model analysis methodology, factors that are used within the model to make classification decisions, as well as various aspects related to the distribution of attributes of records of the target classes may be determined in the depicted embodiment. In at least some embodiments, one or more aggregate contributing factors (e.g., input attribute/feature values that are determined to be more influential than others when the overall training data is taken into account) that have been learned thus far in the model with respect to making classification predictions may be identified, as indicated in element 207. Both aggregate class inclusion factors (e.g., factors influencing decisions as to whether records are on the whole more likely to be classified as members of a particular target class) and aggregate class exclusion factors (e.g., factors influencing decisions as to whether records are on the whole less likely to be classified as members of a particular target class) may be determined in at least some embodiments; in other embodiments, only exclusion or only inclusion factors may be identified. Record-level contributing factors may also be identified in at least some embodiments—e.g., indicating which particular feature values or attribute values contribute to prediction decisions about a given record. Note that in some embodiments, the raw attribute values of the input records of a model may be transformed in various ways to generate internal feature vectors or other feature representations; in such cases, the internal representations which are the most influential factors may first be determined as part of the analysis of the model, and then the corresponding raw attribute values may be determined for presentation to the client.

An interactive interpretation session (IIS) may be initiated (element 210) in various embodiments using one or more graphical and/or web-based interactive interfaces. In some cases, the sessions may be initiated early on during the training of the model, so that any potential problems (e.g., representing potential mismatches between the objectives of the model and the workings of the model) can be detected and corrected quickly. In other cases, models may be interpreted after they have been trained and/or deployed to production. In at least some embodiments, portions of the training data set may have to be annotated or labeled before they can be used for training, and the interpretation sessions may be run concurrently with labeling/annotation sessions; the interpretation information may in effect help guide the selection of records which should be annotated and added to the training data set. In various embodiments, the interpretation sessions may be used for debugging the model. Behind the scenes, as the interpretation information is provided in the sessions and (in at least some cases) model enhancement operations indicated in the interactive sessions are performed, the analysis of contributing factors may be performed concurrently.

A number of different kinds of information may be provided to clients in the interactive interpretation session, with the specific subset of information shown at any given stage being dependent on the feedback provided by the clients. As shown in element 213, indications of the aggregate contributing factors as well as candidate model enhancement actions may be presented in at least some embodiments. The aggregate contributing factors may be sorted (e.g., in decreasing order of influence) in some embodiments, so that clients can quickly determine which factors are most important within the model. A variety of candidate model enhancement actions may be identified and presented in different embodiments, such as changing model hyper-parameters (including for example regularization parameters, mini-batch sizes, numbers and sizes of neural network layers, etc.), changing weights associated with different factors, and/eliminating or adding records or attributes of various types to the training data set.) Some of the information may be presented proactively, e.g., without specific corresponding requests from the clients, while other information may be provided in response to such requests received via the interactive interfaces.

In response to requests specifying particular records or groups of records of the data sets (training, test, or audit data sets), record attributes, sorted record-level class inclusion/exclusion contributing factors as well as other types of detailed information may be presented in various embodiments (element 216). In some embodiments, if desired, record similarity information may be presented: e.g., with respect to a particular record whose predicted class is being considered, the records whose attribute values are most similar (according to various similarity criteria selected by the service) may be presented along with their class information. A number of visualization techniques may be used to highlight such aspects as contributing influence levels (e.g., text attribute terms that have greater influence may be shown in bold or in red, with terms that have less influence being shown in less vivid fonts or shaded), inter-record similarity (e.g., the extent to which two records are similar may be indicated by using similar colors or shades), and so on in different embodiments.

In at least some embodiments, information about various types of distributions associated with the tasks being done by the model may be presented interactively, enabling clients to dig deeper into various segments of the records if desired. For example, graphical representations of confusion matrices for classification models may be shown (element 219), including graphical representations of the relative similarity of records included in the different elements or quadrants of such matrices in one embodiment. Portions of the distribution information as well as the record-level information may be presented proactively, while other portions may be presented in response to explicit requests in at least some embodiments. Proactive actions may be initiated using interactive control elements (e.g., clickable buttons, check-boxes and the like) from any of the different kinds of views presented in various embodiments.

If a client provides input requesting a particular model enhancement action presented via the interfaces, that enhancement action may be initiated by the service in at least some embodiments (element 222). In at least some cases, the model being explored/analyzed/debugged may be re-trained as a result of the requested action. If a new version of the model is generated as a result of such an enhancement action, the new version may be stored, and the results of the action may be presented as part of an interactive interpretation session as well in various embodiments—e.g., the same session as the one in which the enhancement action was requested, or a different section initiated later. Such results may include before-after comparisons with respect to one or more model metrics, for example. If and when a client requests that the interactive interpretation session be concluded (as determined in element 225), the session may be ended (element 229); otherwise, further analysis and presentation of interpretation information and candidate model enhancement actions may be continued (elements 210 onwards) in the depicted embodiment.

It is noted that in various embodiments, some of the operations shown in FIG. 2 may be implemented in a different order than that shown in the figures or may be performed in parallel rather than sequentially. Additionally, some of the operations shown in FIG. 2 may not be required in one or more implementations.

Example Interactive Interfaces

Figure 3:
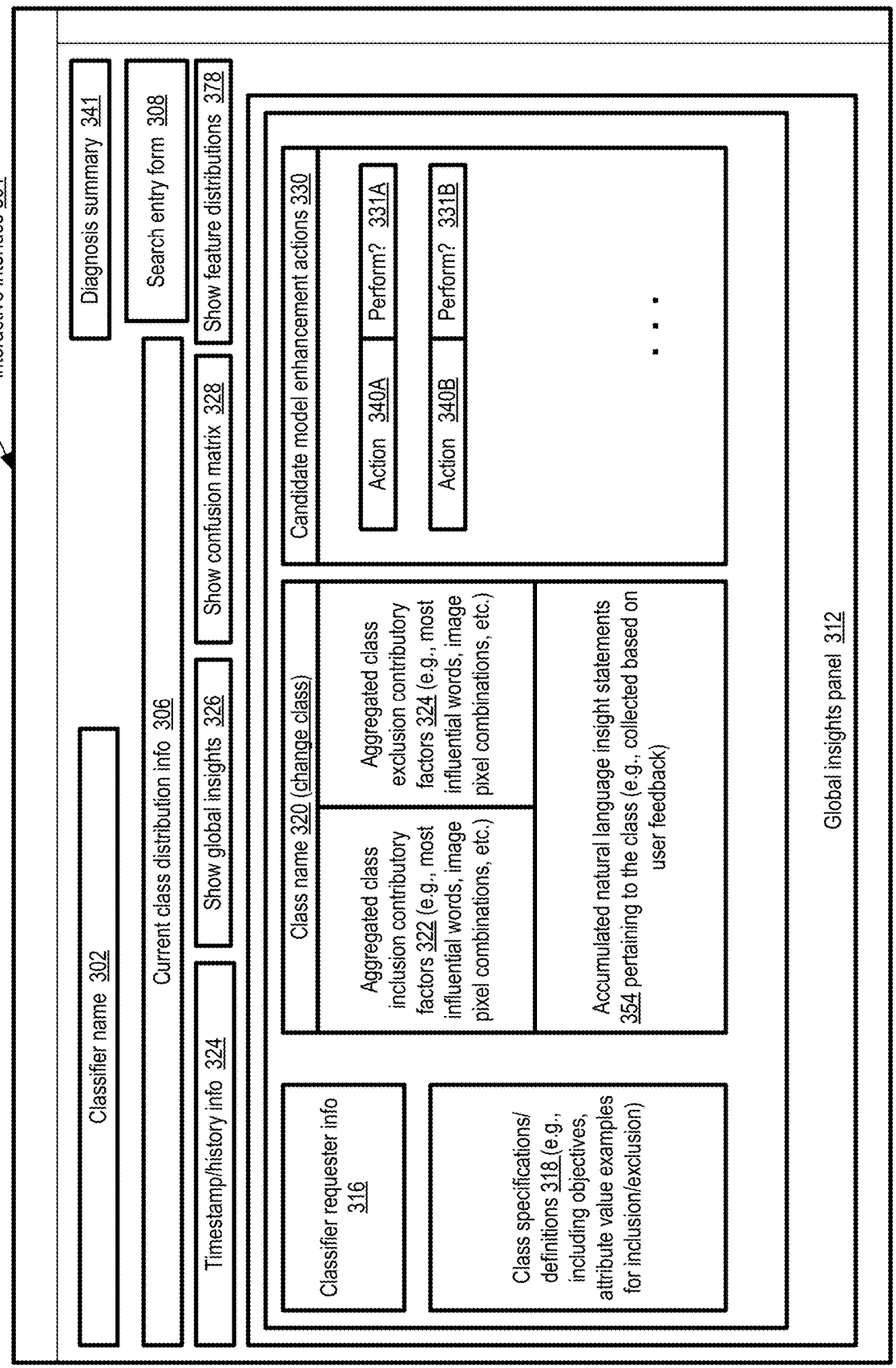
FIG. 3 illustrates an example interactive interface which may be employed to present summarized aggregated contributory factors for model prediction decisions, according to at least some embodiments.

FIG. 3 illustrates an example interactive interface which may be employed to present summarized aggregated contributory factors for model prediction decisions, according to at least some embodiments. As shown, interactive interface 301, which may be presented as part of a web-based portal or a graphical user interface by a classification service or tool, may indicate the name 302 of a classification model (referred to as a classifier), a global insights panel 312, as well as as well as several types of high-level or summarized information in the depicted embodiment.

Within the global insights panel 312, four types of information may be provided, which may be useful to clients wishing to understand the objectives of the classification model, the current behavior of the model, as well as opportunities to improve the current version of the model in the depicted embodiment. The insights provided in panel 312 may be termed "global" as they may represent aggregated information applicable to the model as a whole, in contrast to record-level information which may be provided using other interfaces as discussed below. An identifier or name of the requester of the classifier (e.g., an individual or team at whose request the classifier is being trained or has been trained) may be provided in element 316. In some embodiments, contact information of the classifier requester, such as an email address or an identifier usable to send other types of messages, may also be provided in element 316 in some embodiments, so that the model requester may be contacted if necessary by the client who is using the interface 312 to try to understand and/or debug the model.

Element 318 may show definitions/specifications of one or more target classes of the classifier, as expressed by the classifier requester. This element may include natural language explanations of the purpose of the model, specific examples of text terms or other attribute values which may be correlated with membership in target classes and/or specific examples of terms or attribute values which may be correlated with exclusion from target classes. For example, element 318 may indicate that, from the perspective of the requester of the classification model, a record with an attribute value containing terms T1, T2 and T3 is likely to be a member of a target class C1, while the presence of terms T4, T5 or T6 may indicate that the record is unlikely to be a member of target class C1.

For a given target class 320, aggregated class inclusion contributory factors 322 as well as aggregated class exclusion contributory factors 324 may be shown in panel 312 in the depicted embodiment. For multi-class classifiers, the "change class" interface element may be used to obtain information about other classes instead of the target class whose information is currently being displayed. In at least some embodiments, the factors of each type (inclusion or exclusion) may be sorted, e.g., in terms of decreasing influence on the class results. The most influential words or phrases that cause records to be placed in the class corresponding to name 320 may be presented at the top of a list of such words/phrases, followed by the next-most influential, and so on. In embodiments in which the input data comprises images, influential sub-images comprising groups of adjacent pixels may be shown instead of or in addition to text factors. In section 354 of global insights panel 312, a set of accumulated natural language statements representing learned generalizations about the predictions made (e.g., the equivalent of "85% of the records which have been classified in class A have values between 1 and 5 in attribute N", or "75% of the records which have been classified in class B are about entities located in state P") may be presented. In at least some embodiments, such natural language statements may be added to the list to be displayed in element 354 based on feedback received from a client earlier during the interpretation session (or in a similar interpretation session), as discussed below in the context of the "Add to insights" interface elements shown in FIG. 4.

One or more candidate model enhancement actions 330 identified at the service during the analysis of the classifier, such as action 340A and 340B, may be presented in global insights panel 312 in the depicted embodiment. A number of different types of actions, such as proposed modifications to the training set (e.g., by eliminating detected skews in the training data used thus far), changes to weights assigned to different contributory factors, elimination of some contributory factors from further predictions, changes to labels, changed to hyper-parameters and the like may be proposed in different embodiments. In at least some embodiments, a feedback element similar to the "Perform?" buttons 331A and 331B may be used by the client to indicate that a corresponding candidate enhancement action should in fact be initiated.

In addition to the global insights panel, the interactive interface 301 may include a summary 341 of a set of diagnosis tests that may be used to help decide whether to terminate training of the classifier, a current class distribution information element 306, a search entry form element 308, an update timestamp indicator element 324, a global request insights request element 326, and/or a confusion matrix request element 328 in the depicted embodiment. Note that at least some of the interface elements and regions shown in FIG. 3 may not be required in some embodiments, or may be arranged in a different layout than that shown.

The diagnosis summary 341 may, for example, indicate how many (or what fraction of) a selected set of diagnosis tests have been met in the most recent training iteration of the classifier. The current class distribution information 306 may provide a visualization of the manner in which the data items for which predictions have been generated are distributed among the set of classes, where the class boundaries lie, and so on. The entry form 308 may be used to enter search predicates or queries that are to be used to filter models and/or records for presentation to the client. A timestamp indicating the time of completion of the last training iteration (or the most recent time at which the user has submitted feedback) may be indicated in element 324, together with interface elements to view more detailed historical information with respect to the training iterations. The show global insights element 326 may be used to request the display of information via global insights panel 312. The show confusion matrix element 328 may be used to request a view of a confusion matrix of the classifier, similar to the views shown below in the context of FIG. 7 and FIG. 8. A "show feature distributions" element 378 may be used to request details regarding the distributions of various numeric and/or non-numeric attributes, similar to the distributions discussed in the context of FIG. 5.

Figure 4:
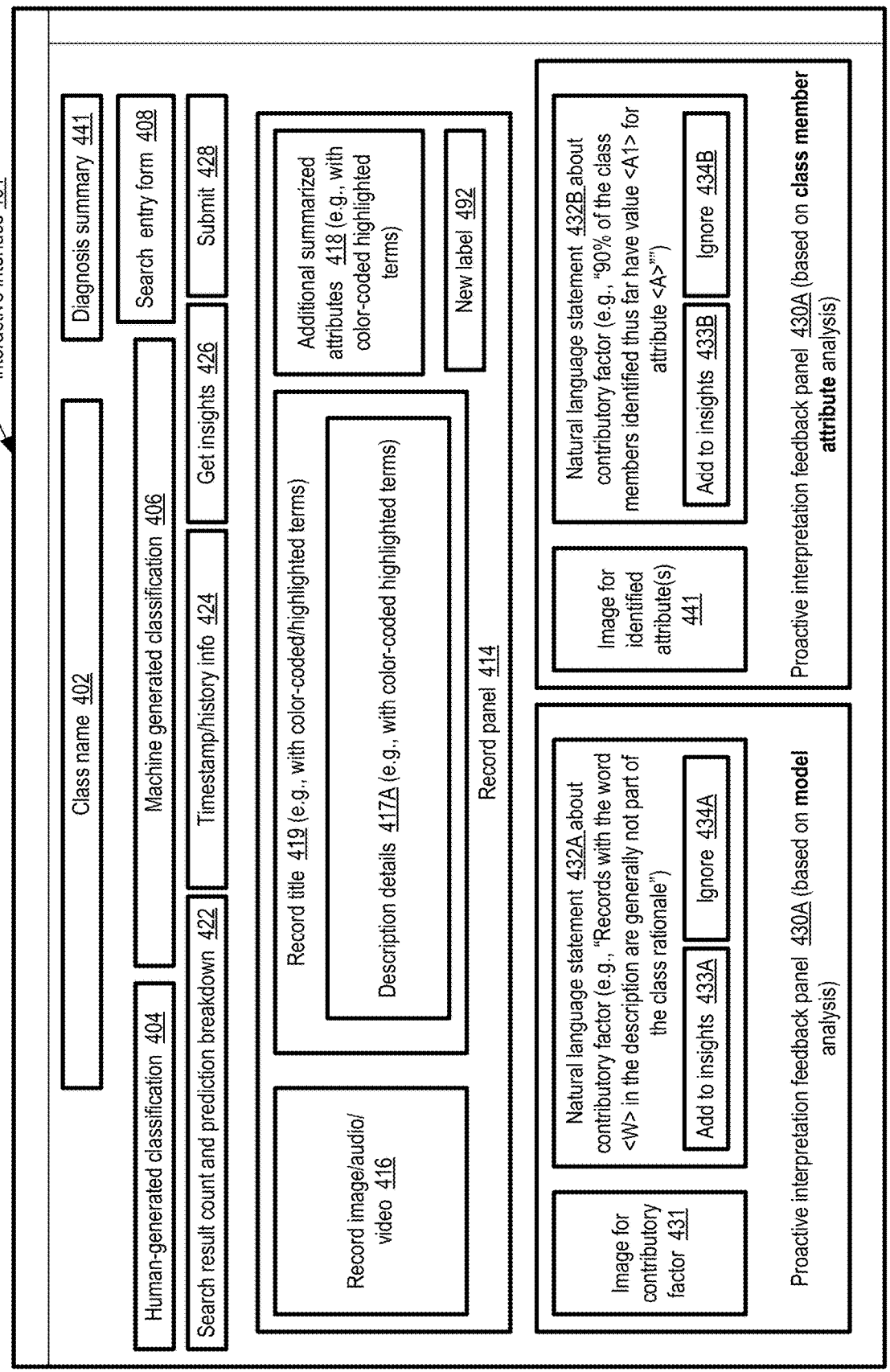
FIG. 4 illustrates an example interactive interface which may be employed to proactively present model interpretation information during the training phase of a model, according to at least some embodiments.

FIG. 4 illustrates an example interactive interface which may be employed to proactively present model interpretation information during the training phase of a model, according to at least some embodiments. Using interactive interface 401, a client may explore the contents of various records which are being used during training, or for which labels are to be generated for further training, and the classification service may provide various types of aggregated or record-level information as the client explores the records. The name of the class to which a record with title 419 has been assigned may be shown in element 402. A human-generated classification label 404 for the record may be presented along with the machine-generated (i.e., model-predicted) classification 406 in the depicted embodiment. Diagnosis summary element 441, and timestamp/history information element 424 may provide similar content as was discussed for elements 341 and 324 in the context of FIG. 3. Search entry form 408 may be used to search for records (and may have been used to obtain the information displayed in record panel 414). Search result count and prediction breakdown element 422 may indicate the total number of records in the data set being searched which match the search criteria, as well as the fraction of that number which belong to various target classes in the depicted embodiment. The "get insights" element 426 may be employed to request additional aggregated and/or record-level insights regarding the current version of the model in the depicted embodiment, while the submit element 428 may be used to submit a new label 492 for the record being displayed.

The title of a record being explored may be shown with color-coded or highlighted terms (indicating the relative influence of record-level contributory factors that were used by the model to classify the record) in element 419; similarly, details of a description attribute of the record with highlighted/color-coded terms may be shown in element 417A. If the record's attributes comprise an image, a video clip, or an audio clip, such non-text content may be displayed in element 416 in the depicted embodiment. Additional attributes may be shown in summarized form in element 418, and a new label (if desired) for the record may be submitted using the element 492.

In the embodiment shown in FIG. 4, two types of interpretation information for the model and its data sets may be presented proactively via panels 430A and 430B respectively. In panel 430A, insights gathered from analyzing the model (via white-box or black-box analysis) and associated metadata such as the model requester's objectives may be presented, while in panel 430B, insights gathered from class member attribute analysis or distributions of attribute values in various classes may be presented. For example, with respect to the model analysis, a natural language statement 432A regarding a contributory factor such as "records with the word <W> in the description are generally not part of the class rationale" may be presented to the client, together with an image 431 of the contributory factor, an "add to insights" control element 433A and an "ignore" control element 434A. In the example shown, the word "<W>" may, for example, be part of the description attribute shown in element 417A, thus linking the statement 432A to the record with title 419. If the client agrees that the natural language statement 432A is helpful in interpreting the model, the "add to insights" element 433A may be used to include the statement 432A in an accumulated list of global insight statements (which may, for example, be displayed via interface elements similar to element 354 of FIG. 3). If the client wishes to dismiss the natural language statement 432A, the "ignore" element 434A may be used instead.

In panel 430A, insights based on examination of the records that have been placed in the target class (with class name 402) may be presented proactively in the depicted embodiment. For example, a natural language statement 432B about a potential contributing factor to a class prediction may be shown, such as the equivalent of "90% of the class members identified thus far have value <A1> for attribute <A>". An image indicative of the contributory factor (such as value <A1>) may be shown in element 441. An "add to insights" control element 433B may be used by the client to cause the presented insight to be added to an accumulated list of insights (which may be displayed via interface elements similar to element 354 of FIG. 3); the "ignore" element 434B may be used to dismiss the statement 432B if desired by the client.

Proactively presented natural language insight statements similar to 432A and/or 432B may help the process of model interpretation, as well as model improvement, in several ways in various embodiments. For example, they may help clients to understand the current behavior of the model, without having to submit specific requests about such behavior. In addition, they may help clients to detect apparent divergences (if any) between the stated objectives of the model, and what has been learned by the model thus far, which may in turn lead to changes such as additions/deletions of training data to align the model more closely with the objectives. Statements based on data analysis (such as 432B) may enable clients to discover skews in the training data used thus far in some embodiments, and take actions accordingly.

FIG. 5 illustrates an example interactive interface which may be employed to present feature-level statistical distribution information for a machine learning model, according to at least some embodiments. Information about the distributions of several attributes or features of the data set being used for a model may be presented via such an interface, e.g., in response to a programmatic request via an interface element similar to the "show feature distributions" element 378 of FIG. 3. In interactive interface 501, the name of the classifier whose data sets are being explored may be presented in element 502. The specific attributes whose distribution information is to be presented may be selected using a combination of interface element 508 (used to search for attributes by entering text terms corresponding to attribute names or descriptions) and data type selector element 506. For example, a client may indicate that distribution information regarding integer, floating point, and text string attributes should be presented using respective checkbox elements for "int", "float" and "string" types in element 506. The number of attributes of each type (e.g., 2 integer attributes, 2 floating point attributes, and 12 string attributes in the depicted example scenario) may also be shown in element 506 in some embodiments. Clients may indicate sorting criteria to be used to determine the order in which the attributes are to be arranged using a "sort by" interface element 504 in the depicted embodiment; available sorting criteria may for example include sorting by name, sorting by feature order (i.e., the order in which the attributes are stored in each input data record), sorting by contribution weight to the model's predictions, etc. In at least some embodiments, sorting based on metrics of the differences between various data sets used for the model may also be supported. For example, behind the scenes, the system may generate information about the statistical distribution of values of various attributes of the records of a training data set, a test data set, an audit data set, and so on, and use such distribution information to generate one or more metrics of differences (also referred to as "drift") between the respective data sets; such metrics may be presented to clients as one of the sorting options in at least one embodiment.

In the example scenario of FIG. 5, the following information may be provided in respective columns of a table for numeric features 512: the name of the attribute/feature 514, the count 516 of records in which the attribute is included, the number of records 518 in which the attribute value is missing or invalid, the mean 520, the standard deviation 522, the minimum value 524 in the records, the median value 526, and the maximum value 520. If a client wishes to view graphs illustrating the distribution metrics for a particular attribute, e.g., for training data versus test data versus audit data, a "show charts for" element 522 may be used to indicate the desired charts in at least some embodiments.

With respect to non-numeric or string features 532, the following types of information may be provided in respective columns in the depicted embodiment: the name 534, the count 536 of records in which the attribute is included, the number of records 538 in which the attribute value is missing or invalid, how many unique values 540 of the attribute are present among the records, the most frequent terms or values (shown in "Top" column 542), the number of records in which those most frequent terms or values occur (in the "top freq" column 544), and/or the average length 546 of the strings. Charts illustrating the distribution information for the various string attributes may be obtained using the "show charts for" elements 550, e.g., for training data sets, test data sets and/or audit data sets. In at least some embodiments, comparisons between the training data attribute distributions and the test or audit data attribute distributions may be presented via interactive interfaces similar to interface 501, enabling clients to determine for example whether the test data is very different than the training data (which may help explain model convergence problems). In at least some embodiments, the system may utilize heuristic rules or machine learning models to identify the differences or drift between the data sets, and highlight the specific attributes/features that contribute most to the differences via the interactive interfaces. In one implementation, for example, clients may be able to view record attributes arranged in order of decreasing (or increasing) contribution to overall difference between one data set D1 (e.g., a training data set) and another data set D2 (e.g., a test data set).

FIG. 6 illustrates an example interactive interface which may be employed to enable users to change weights assigned to prediction contribution factors of a machine learning model, according to at least some embodiments. In interactive interface 601, the name of the classifier being interpreted may be shown in element 602, and the particular target class for which inclusion and exclusion factors are being shown may be indicated in element 603 in the depicted embodiment. A search entry form 608 may be used to obtain information about specific attributes' contributions to the predictions made by the model. Filter control element 606 may be used to select a subset of records for which the contributing factors and their weights is to be presented. For example, information about all the records (e.g., of a training or test data set) may be requested by using the "all records" check box, while information about the records placed in specific quadrants of a confusion matrix may be requested using the "confusion matrix quadrant" check box. In some embodiments, the data sets may be subdivided into clusters based on various types of similarity analysis, and a client may request information about a specified cluster or clusters via the "data cluster" checkbox of element 606. Custom filters for specifying the records for which information is to be presented may be indicated by clients after checking a "custom filter" check box in some embodiments.

For aggregated class inclusion contributing factors 612, the attribute name and value pairs for the most influential attributes may be indicated in column 614, and the number of records that contain each such attribute and value combination may be indicated in column 616. For example, if a text attribute T1 with a value W1 is the most influential in determining whether the record is included in a target class 603, and W1 appears in 500 records, the #containing records field would show the value 500 for the name-and-value pair <T1=W1>. If the client wishes to reduce the weight assigned to the (attribute, value) combination identified as a contributing factor 612, the "−" (minus) element of the weight modification action column 618 for that combination may be used in the depicted embodiment. Similarly, the "+" (plus) element of action column 618 may be used to increase the assigned weight, and the "X" element may be used to remove the contributing factor when making further predictions (as such, the use of the "X" element may have the effect of reducing the weight of the factor to zero).

A similar approach may be taken with respect to class exclusion factors 622 in interactive interface 601 in the depicted embodiment. Name and value pairs for the attributes may be presented in column 624, the number of records in which those values occur may be shown in column 626, and control elements to change weights for the factors may be shown in column 628. Weights for class exclusion assigned to the (attribute, value) combinations may be increased using the "+" elements, decreased using the "−" elements, and eliminated using the "X" elements.

Other types of options for actions comprising increasing/decreasing weights may be provided in different embodiments.

Figure 7:
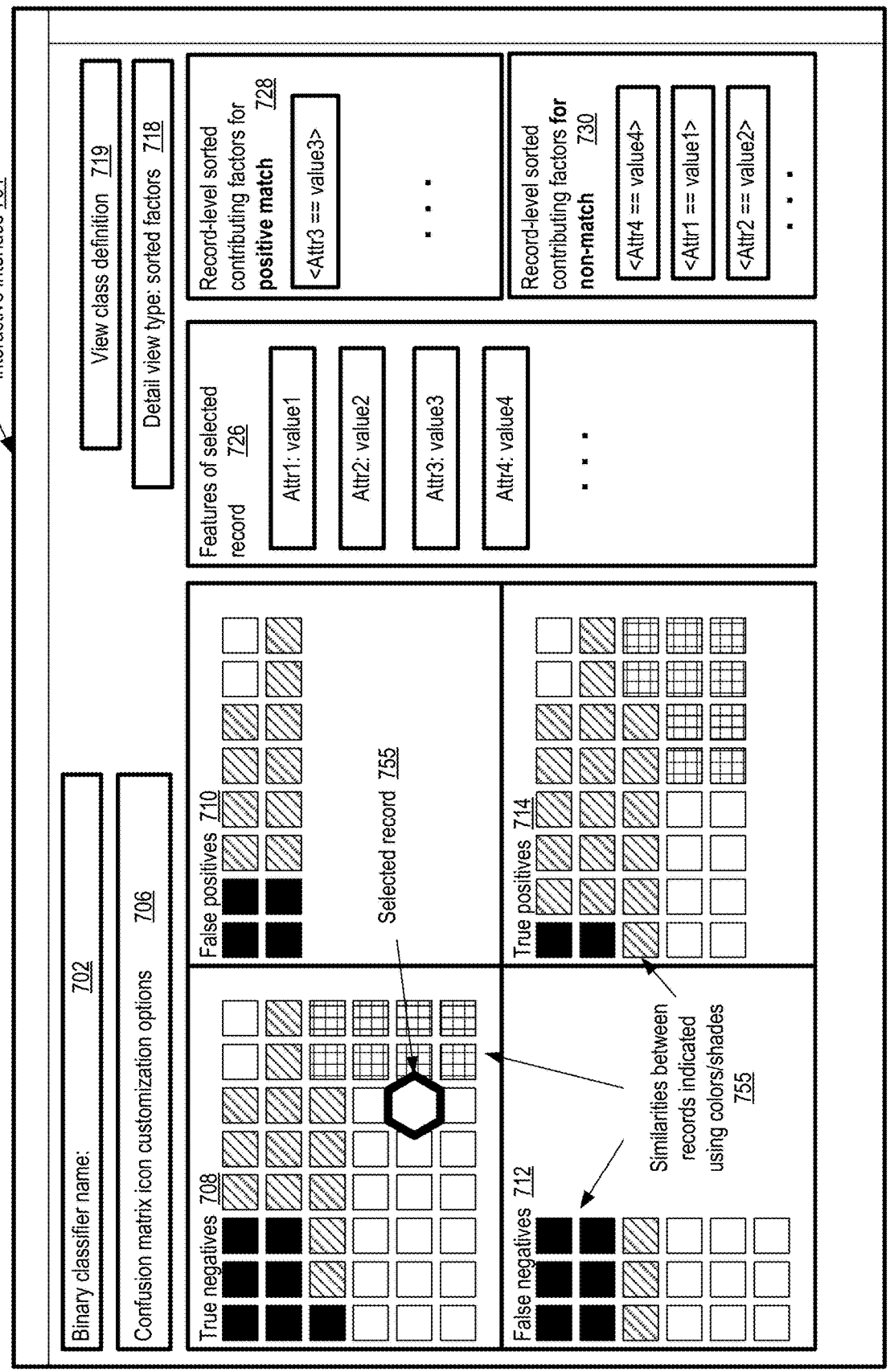
FIG. 7 illustrates an example interactive interface which may be employed to present confusion matrix information of a classification model, according to at least some embodiments.

FIG. 7 illustrates an example interactive interface which may be employed to present confusion matrix information of a classification model, according to at least some embodiments. A confusion matrix for a version of a binary classifier with a name indicated in element 702, comprising respective representations of at least some true negative records 708, false positive records 710, false negative records 712 and true positive records 714 may be included in an interactive interface 701 in the depicted embodiment. Note that in at least some embodiments this type of view may also or instead be presented for multi-class classifiers, and is not limited to binary classifiers. A client may access such an interface 701, for example, by clicking on an interface element similar to "show confusion matrix" element 328 of FIG. 3 in some embodiments. In other embodiments, the confusion matrix information may be presented proactively without requiring a specific request. The client may access the class definition (e.g., information similar to that shown in element 318 of FIG. 3) using a "view class definition" interface element 719 in the depicted embodiment.

Within each of the four elements of the confusion matrix, icons (squares in the depicted example) representing individual records of a data set for which class predictions have been generated may be shown in the depicted embodiment. In at least some embodiments, the total number of records of the element may also be indicated for each element—e.g., how many records were found to be false positives, how many were found to be true positives, etc., may be indicated in the matrix. A client may customize the details of the representations of the confusion matrix in the depicted embodiment, e.g., by using interface element 706 to indicate the shapes, colors or shading schemes to be used, whether the icons for the records should include attribute values, and so on. In the example scenario shown in FIG. 7, colors, patterns and/or shades may be used to indicate the similarities between various records, as indicated by label 755. For example, for a pair of records whose similarity exceeds a threshold, the same color, pattern or shade (such as black, or a cross-hatching pattern) may be used. If a dark hue is used to indicate high levels of similarity, lighter hues of the same color may be used to indicate lower levels of similarity, and so on. Note that similar confusion matrix visualizations may be provided in some embodiments for filtered subsets of a data set—e.g., for records that have been filtered based on selected attributes specified by a user. Furthermore, analogous visualizations (e.g., showing icons with visual properties indicative of similarity with other records) may be presented for unlabeled data as well in some embodiments, and not just for labeled data which can be placed into the quadrants of the confusion matrix as shown. For example, for unlabeled records which have been classified using a binary classifier for a target class, a single-row, two-column matrix of icons (one column for those records which have been included in the target class of the binary classifier, and one column for those records which have been excluded from the target class) may be presented in one embodiment.

In order to view details of a particular record in any of the elements or quadrants of the confusion matrix, a client may select the record using a mouse or similar interface. On the right side of the interface 701, the details of the selected record (record 755 in the depicted example) may be presented. The specific contents of the detailed view may be chosen by the client using a "detail view type" interface element 718 in some embodiments. In the particular detailed view presented in FIG. 7, labeled "sorted factors", a list of the values of the features or attributes of the selected record is presented in panel 726 (e.g., showing that attribute Attr1 has value value1, Attr2 has value value2, etc.). In addition, to help explain the class prediction for the selected record, two types of contributing factors may be presented in the depicted embodiment: sorted record-level contributing factors for positive match 728, and sorted record-level contributing factors for non-match 730. The value of Attr3 contributed towards the potential designation of the record 755 as a positive match for the target class of the binary classifier, while the values of Attr4, Attr1 and Attr2 (in order of decreasing significance) contributed towards the actual designation of the record 755 as being a non-member of the target class. The selected record 755 is shown as a true negative, so the non-match factors overcame the positive match factors in the depicted example.

Figure 8:
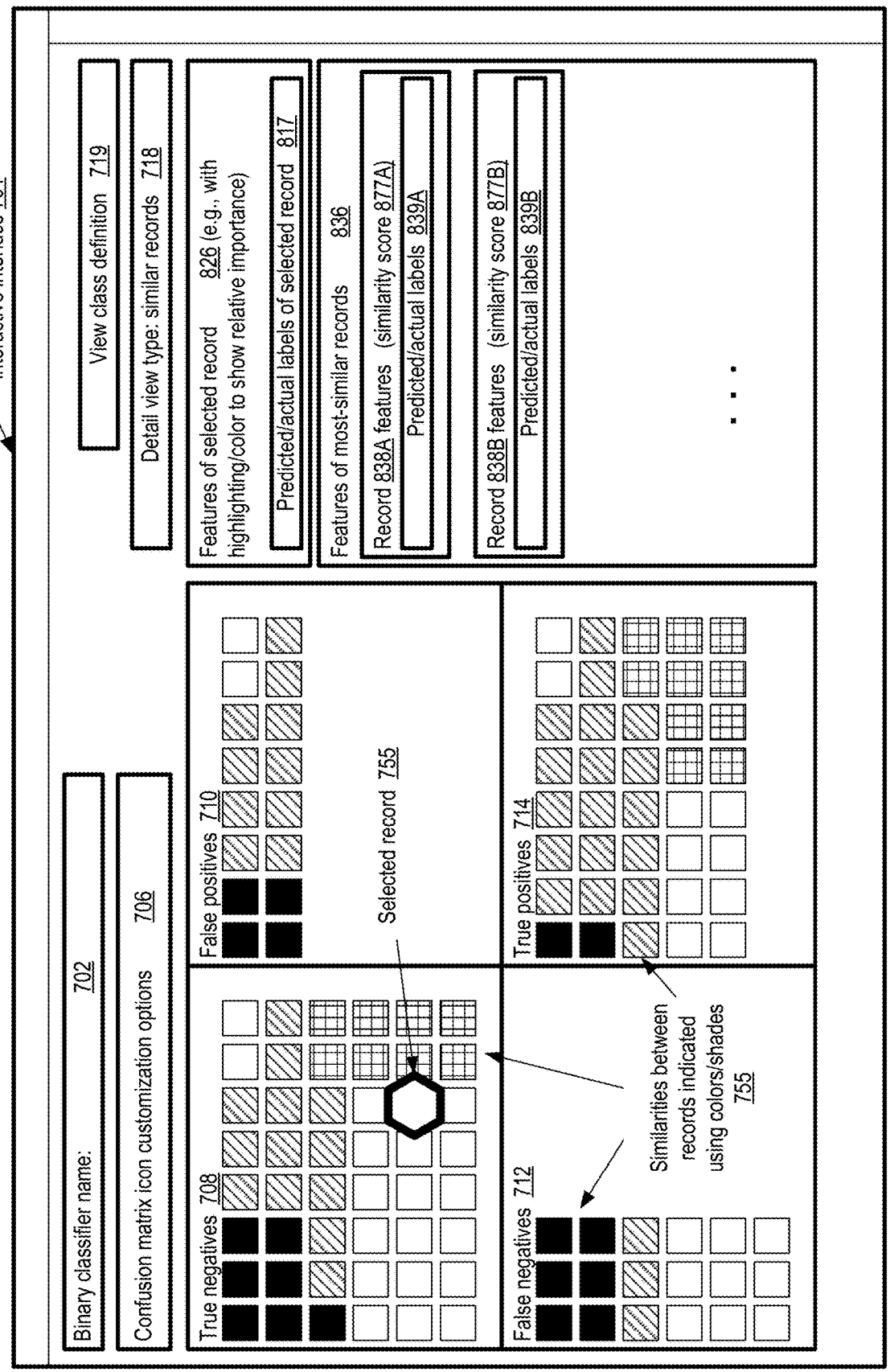
FIG. 8 illustrates an example interactive interface which may be employed to present information about records which meet similarity criteria with respect to a record of interest, according to at least some embodiments.

FIG. 8 illustrates an example interactive interface which may be employed to present information about records which meet similarity criteria with respect to a record of interest, according to at least some embodiments. FIG. 8 shows a modified view of information presented via interactive element 701 (which was also shown in FIG. 7). The confusion matrix information comprising panels 708, 710, 712 and 714, as well as the binary classifier name element 702, matrix customization options 706 and the view class definition element 719 are unchanged from the view presented in FIG. 7. However, the type of detailed information about selected record 755 has been changed, e.g., based on input provided via "detail view type" element 718. Whereas in FIG. 7, the selected detail view type was "sorted factors", in FIG. 8, the selected detail view type is "similar records".

In the scenario depicted in FIG. 8, at least a subset of the features or attributes of the selected record may be shown in element 826, e.g., with highlighting, coloring, shading or other techniques used to show the relative contributions of the different features to the class prediction for the record. The predicted and/or actual labels of the selected record may be shown in element 817. The classification service may utilize any of a number of similarity analysis algorithms (e.g., using Jaccard similarity, cosine similarity, Euclidean distances etc. depending on the type of attribute) to determine similarity scores between pairs of records in the depicted embodiment. Features/attributes of the records which are most similar in the data set to the selected record may be shown in panel 836 in the example scenario of FIG. 8, e.g., in order of decreasing similarity scores 877A, 877B etc., with respect to the selected record 755. For each of the records shown in panel 836, respective feature values 838 (e.g., 838A, 838B, etc.) may be displayed in the depicted embodiment, as well as the predicted and actual labels 839 (e.g., labels 839A, 839B etc.). By comparing the attribute values of similar records, as well as the labels generated for the records, a client may be able to gain a better appreciation of the workings of the version of the binary classifier being examined in the depicted embodiment This type of data may also be helpful in identifying labeling errors in the training data in various embodiments.

Figure 9:
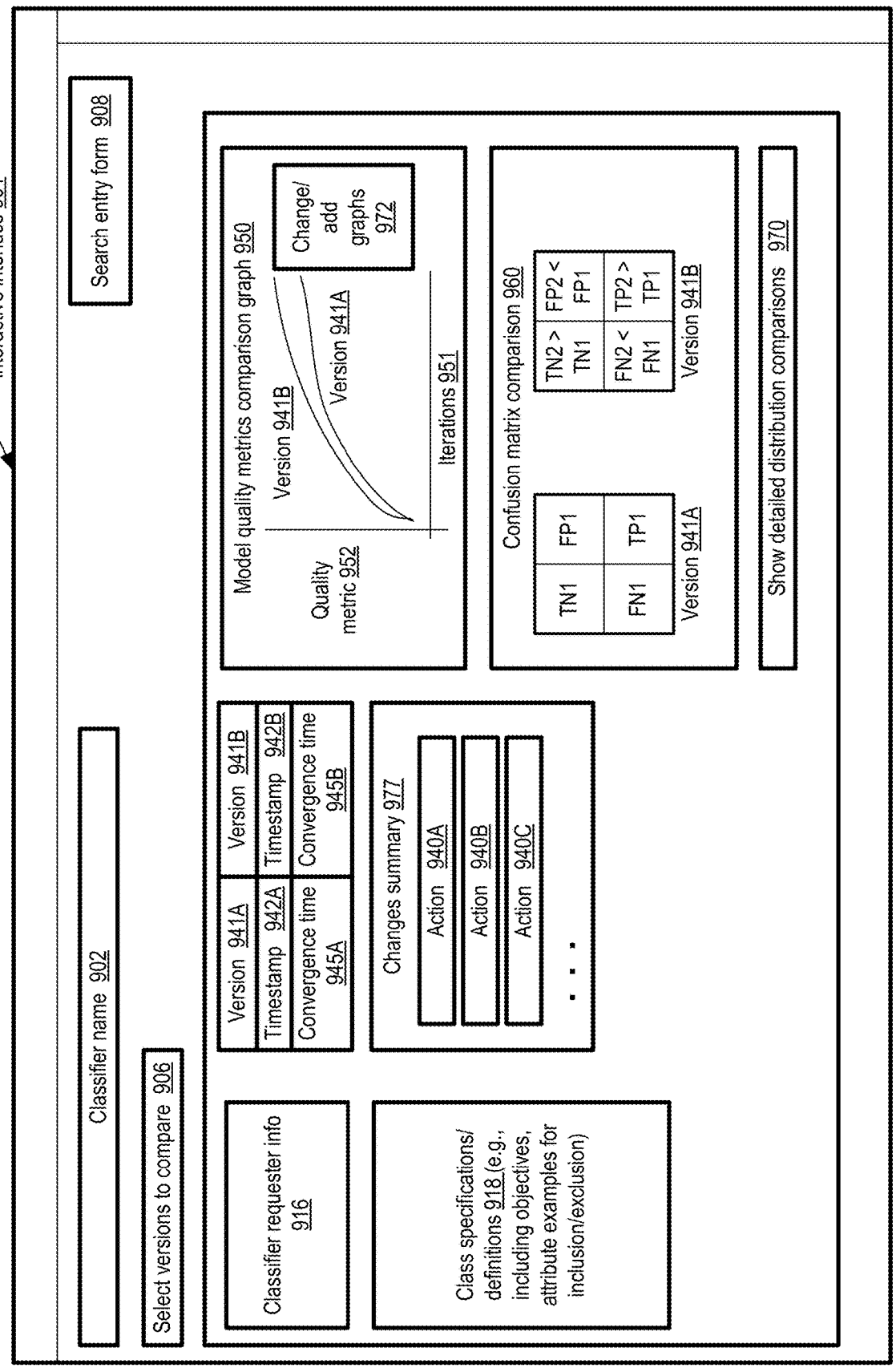
FIG. 9 illustrates an example interactive interface which may be employed to present comparison information about a pair of model versions, according to at least some embodiments.

FIG. 9 illustrates an example interactive interface which may be employed to present comparison information about a pair of model versions, according to at least some embodiments. In interactive interface 901, the name of a classification model 902 may be indicated, along with an interface element 906 usable to select versions of the model which are to be compared. A search entry form 908 may be used to search for other classification models whose versions are to be analyzed in the depicted embodiment.

Information about the requester or owner of the classification model versions may be presented in element 916 (similar to element 316 of FIG. 3), and the definitions or specifications of the target class9es) may be shown in element 918 (similar to element 318 of FIG. 3). The names of the two versions being compared may be presented in elements 941A and 941B, along with respective timestamps 942A and 942B indicating (for example) when the training of the versions was completed. In at least some embodiments, an indication of the model training time for the versions may be presented in elements 945A and 945B. In at least some embodiments, the second version 941B may have been generated and stored as a result of executing one or more model enhancement actions with respect to the first version 941B, and a summary of the changes between the two versions may be shown in element 977. A list of model enhancement actions (which may have been initiated in response to requests received regarding candidate model enhancement actions identified by the classification service) which resulted in the second version 941B may be shown, such as actions 940A, 940B, 940C etc. In some cases, one of the benefits of implementing such enhancement actions may include a shorter time to model convergence, and such an improvement in training time may be indicated by the convergence time values 945A and 945B.

Any of several other types of improvements between the two versions may be displayed via interface 901 in different embodiments, such as improvements in one or more quality metrics 952. A model quality metrics graph 950 may be presented, for example, with respective curves shown for versions 941A and 941B as a function of training iterations 951 or training time. A client may change the kinds of metrics displayed, or properties such as the X-axis, using interface element 972 if desired in the depicted embodiment.

A comparison between the confusion matrices of the two versions 941A and 941B may be shown in panel 960. "TN1" and "TN2" may indicate the counts or fractions of true negatives for the respective versions, "TP1" and "TP2" may indicate the counts/fractions of true positives for the respective versions, "FN1" and "FN2" may indicate the counts or fractions of false negatives for the respective versions, "FP1" and "FP2" may indicate the counts/fractions of false positives for the respective versions. Panel 960 may indicate benefits of the model enhancement actions, e.g., to the extent that the true positives increase (TP2>TP1), the true negatives increase (TN2>TN1), the false positives decrease (FP2<FP1) and/or the false negatives decrease (FN2<FN1). Using element 970, a client may examine more details regarding the distributions of records and attributes by the two versions in the depicted embodiment. In some embodiments, a portion of an interface similar to interface 901 may also be used to present global or aggregated insights (e.g., significant contributing factors) for each model version, which may help users assess how closely the different versions align with the users' intent.

Example Provider Network

Figure 10:
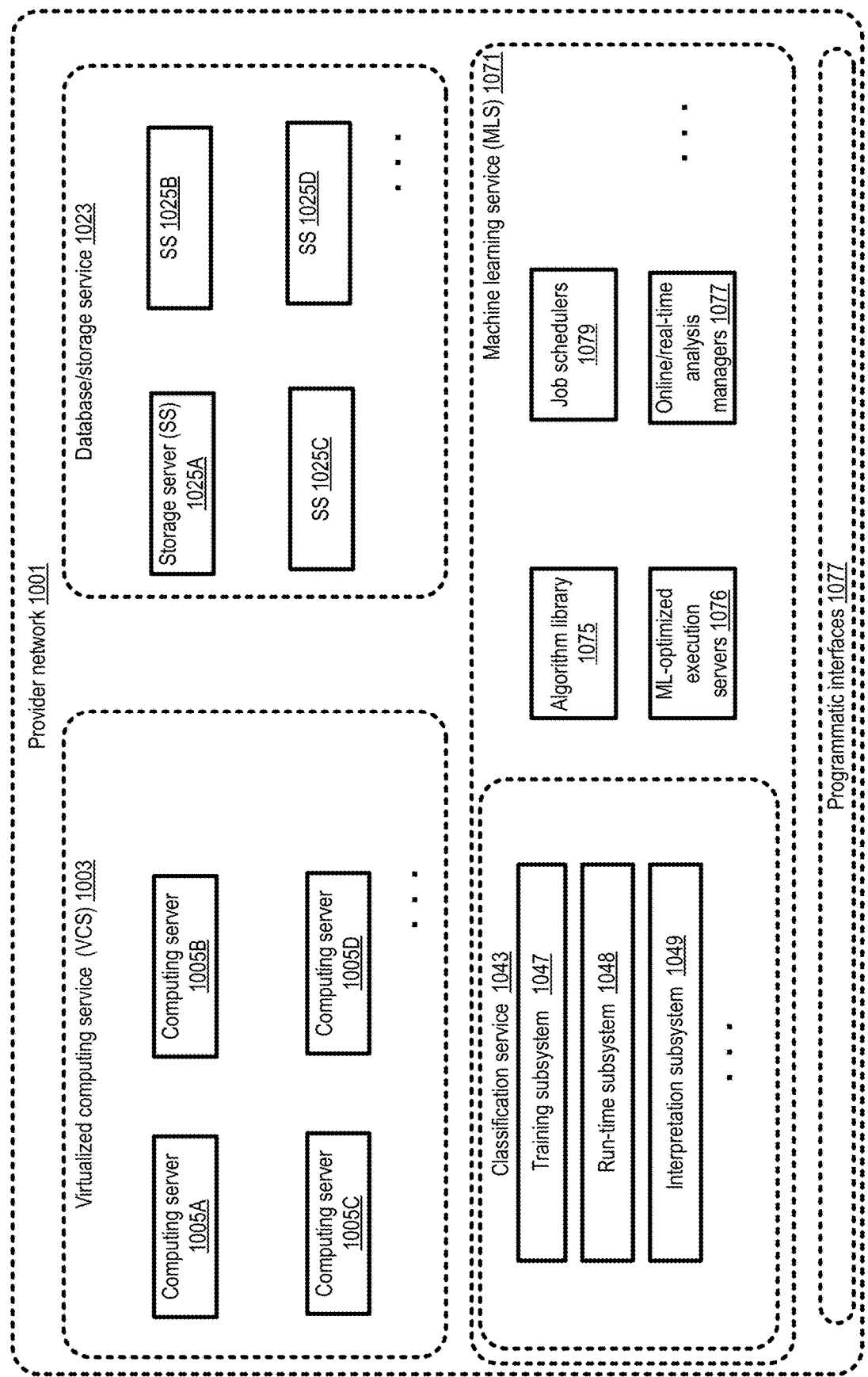
FIG. 10 illustrates an example provider network environment in which a classification service may be implemented, according to at least some embodiments.

In at least some embodiments, the classification service providing interactive model interpretation and enhancement interfaces may be implemented as part of a suite of services of a provider network. FIG. 10 illustrates an example provider network environment in which a classification service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtualized computing service (VCS) 1003, a database/storage service 1023, and a machine learning service (MLS) 1071. The machine learning service 1071 in turn may comprise a classification service 1043 (which may have at least some of the features and functionality of the classification service discussed in the context of FIG. 1 and other figures) in at least some embodiments; in other embodiments, the classification service may be implemented as a separate service rather than as a component of the MLS. Components of a given service may utilize components of other services in the depicted embodiment—e.g., for some machine learning tasks, a component of the machine learning service 1071 may utilize virtual machines implemented at computing servers such as 1005A-1005D of the virtualized computing service, the raw data and/or metadata for various machine learning tasks may be stored at storage servers 1025 (e.g., 1025A-1025D) of storage service 1023, and so on. Individual ones of the services shown in FIG. 10 may implement a respective set of programmatic interfaces 1077 which can be used by external and/or internal clients (where the internal clients may comprise components of other services) in the depicted embodiment.

As shown, the classification service 1043 may comprise, among other components, a training subsystem 1047, a run-time subsystem 1048 and an interpretation subsystem 1049 in the depicted embodiment. The training subsystem may comprise one or more computing devices that collectively coordinate the training of classification models of various types (e.g., binary classifiers, multi-class classifiers, multi-label classifiers, etc. for text, image, multi-content-type and other types of records) in various embodiments. The run-time subsystem may comprise one or more computing devices which may be used to manage the execution of trained classifiers to provide class predictions after the training iterations are complete. The interpretation subsystem 1049 may include, for example, white-box and black-box model analyzers, proactive and reactive information presentation managers, model enhancement action implementation and recommendation managers, and so on in the depicted embodiment, which collectively determine and present the kinds of model interpretation and enhancement information discussed above.

The classification service 1043 may interact with one or more other services of the provider network in at least two ways in the depicted embodiment. First, resources of other services, such as computing servers 1005 or storage servers 1025 may be used to perform some of the computations involved in classifier training, interpretation and execution, and/or to store input data or results of classifiers—e.g., one or more of the data sources from which data items of a source data set are retrieved may comprise resources of the database/storage service. The storage service 1023 and/or the VCS 1003 may each provide high levels of availability, data durability, and failure resilience, enabling workloads associated with a large collection of classification customers to be handled in various embodiments. Of course, in various embodiments, algorithms obtained from algorithm library 1075 may be used for various aspects of classifier training and the like. In some embodiments, execution servers 1076 that are optimized specifically for machine learning algorithms may be employed for classifier training and/or execution. Job schedulers 1079 may coordinate resource allocation and scheduling for numerous classifier development efforts concurrently in some embodiments. In one embodiment, online/real-time analysis managers 1077 of the MLS may be used to respond to classification requests for streaming data records as soon as the records are obtained.

In some embodiments, the model interpretation and enhancement techniques described herein may be implemented without acquiring resources of network-accessible services such as those shown in FIG. 10. For example, a standalone tool implemented at one or more computing devices which are not part of a network-accessible service may be used in some embodiments.

Use Cases

The techniques described above, of providing model interpretation information and/or enhancement options during and after the training of machine learning models may be useful in a variety of scenarios. As machine learning tasks are applied to solve more and more different kinds of problems, non-experts in the field of machine learning may become more involved in the development and use of models such as classifiers. For a variety of reasons, such as differences in attribute value distributions between training and test data, incomplete data records, skewed training data which has few positive examples of target classes, sub-optimal hyper-parameter settings and so on, the results being produced by a machine learning model may be non-intuitive in some cases. By providing explanatory information about a model's behavior, including highlighting the important factors contributing to a model's predictions, the techniques described herein may enable corrective actions (if needed) to be implemented early on in the development cycle. Significant reductions in overall model training resource usage and time, as well as improved quality classifiers, may be achieved using the described techniques. Even for models that meet desired quality criteria, the explanatory information provided to users may be extremely helpful in improving trust levels.

Illustrative Computer System

Figure 11:
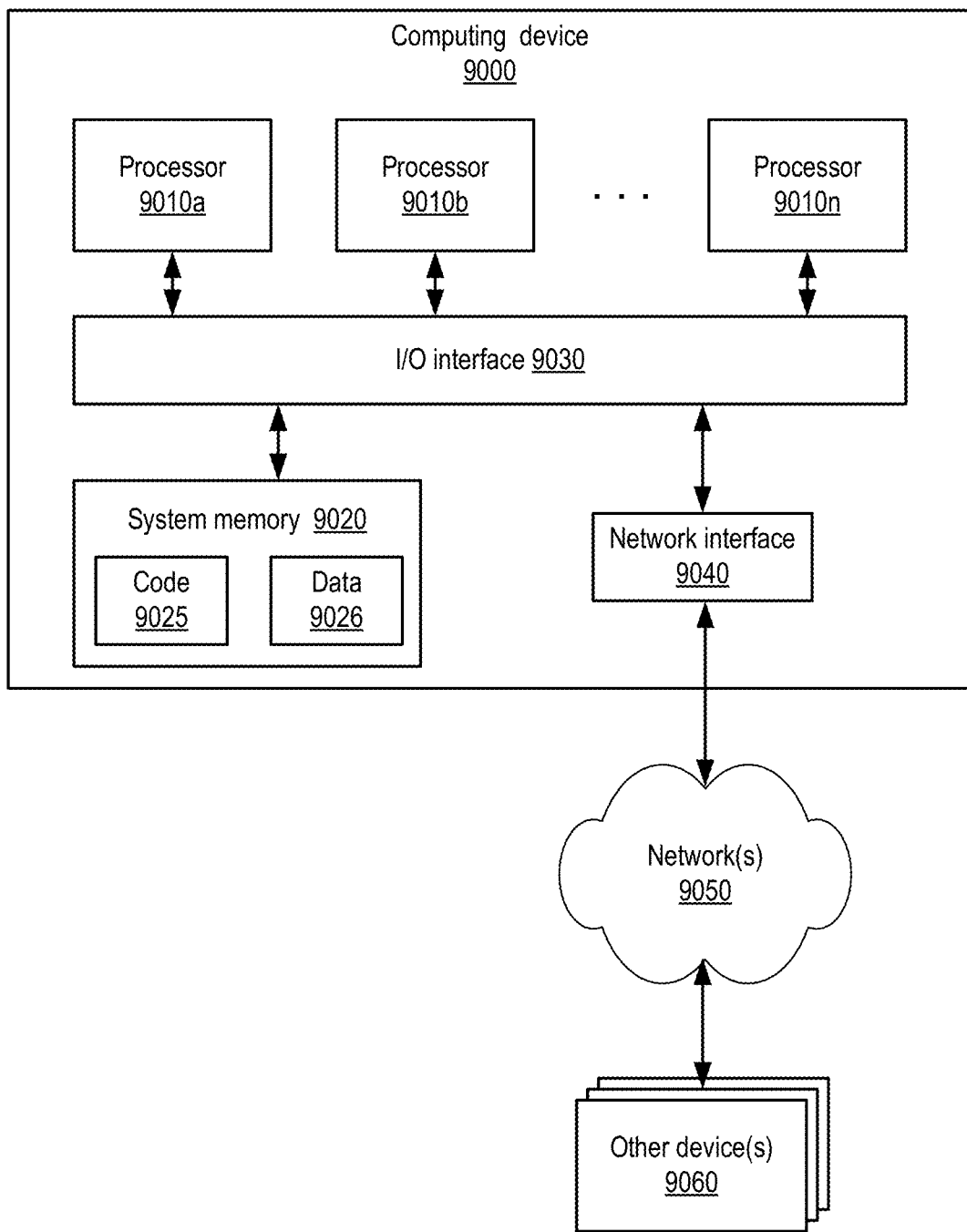
FIG. 11 is a block diagram illustrating an example computing device that may be used in at least some embodiments.

In at least some embodiments, a server that implements one or more of the techniques described herein, including for example components of network-accessible services including machine learning services and classification services at which interactive model interpretation sessions are implemented and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
obtaining, at a cloud computing environment, a plurality of predictions generated by a machine learning model;
determining, at the cloud computing environment, that an explanatory data set for at least a subset of the plurality of predictions is to be provided; and
presenting, via one or more programmatic interfaces from the cloud computing environment, an explanatory data set for at least the subset, wherein the explanatory data set comprises a list of factors which contributed to predictions generated by the machine learning model for at least the subset, wherein the list is sorted based on respective extents to which individual factors contributed to the predictions generated by the machine learning model.

2. The computer-implemented method as recited in claim 1, wherein the machine learning model comprises a classification model.

3. The computer-implemented method as recited in claim 1, wherein a particular factor of the list of factors comprises a word or phrase which was present in a record for which a prediction of the plurality of predictions was generated.

4. The computer-implemented method as recited in claim 1, wherein a particular factor of the list of factors comprises a portion of an image which was present in a record for which a prediction of the plurality of predictions was generated.

5. The computer-implemented method as recited in claim 1, further comprising:
presenting, via the one or more programmatic interfaces from the cloud computing environment, a candidate model enhancement action for the machine learning model; and
performing the candidate model enhancement action at the cloud computing environment in response to input received via the one or more programmatic interfaces.

6. The computer-implemented method as recited in claim 1, further comprising:
presenting, via the one or more programmatic interfaces from the cloud computing environment, a set of statistics pertaining to a particular attribute of records for which respective predictions of the subset were generated.

7. The computer-implemented method as recited in claim 1, further comprising:
presenting, via the one or more programmatic interfaces from the cloud computing environment, a confusion matrix of the machine learning model.

8. A system, comprising:
one or more computing devices;
wherein the one or more computing devices include instructions that upon execution on or across the one or more computing devices:
obtain, at a cloud computing environment, a plurality of predictions generated by a machine learning model;
determine, at the cloud computing environment, that an explanatory data set for at least a subset of the plurality of predictions is to be provided; and
present, via one or more programmatic interfaces from the cloud computing environment, an explanatory data set for at least the subset, wherein the explanatory data set comprises a list of factors which contributed to predictions generated by the machine learning model for at least the subset, wherein the list is sorted based on respective extents to which individual factors contributed to the predictions generated by the machine learning model.

9. The system as recited in claim 8, wherein the machine learning model comprises a classification model.

10. The system as recited in claim 8, wherein a particular factor of the list of factors comprises a word or phrase which was present in a record for which a prediction of the plurality of predictions was generated.

11. The system as recited in claim 8, wherein a particular factor of the list of factors comprises a portion of an image which was present in a record for which a prediction of the plurality of predictions was generated.

12. The system as recited in claim 8, wherein the one or more computing devices include further instructions that upon execution on or across the one or more computing devices:
    present, via the one or more programmatic interfaces from the cloud computing environment, a candidate model enhancement action for the machine learning model; and
    perform the candidate model enhancement action at the cloud computing environment in response to input received via the one or more programmatic interfaces.

13. The system as recited in claim 8, wherein the one or more computing devices include further instructions that upon execution on or across the one or more computing devices:
    present, via the one or more programmatic interfaces from the cloud computing environment, a set of statistics pertaining to a particular attribute of records for which respective predictions of the subset were generated.

14. The system as recited in claim 8, wherein the one or more computing devices include further instructions that upon execution on or across the one or more computing devices:
    present, via the one or more programmatic interfaces from the cloud computing environment, a confusion matrix of the machine learning model.

15. One or more non-transitory computer-accessible storage media storing program instructions that when executed on or across one or more processors:
    obtain, at a cloud computing environment, a plurality of predictions generated by a machine learning model;
    determine, at the cloud computing environment, that an explanatory data set for at least a subset of the plurality of predictions is to be provided; and
    present, via one or more programmatic interfaces from the cloud computing environment, an explanatory data set for at least the subset, wherein the explanatory data set comprises a list of factors which contributed to predictions generated by the machine learning model for at least the subset, wherein the list is sorted based on respective extents to which individual factors contributed to the predictions generated by the machine learning model.

16. The one or more non-transitory computer-accessible storage media as recited in claim 15, wherein the machine learning model comprises a classification model.

17. The one or more non-transitory computer-accessible storage media as recited in claim 15, wherein a particular factor of the list of factors comprises a word or phrase which was present in a record for which a prediction of the plurality of predictions was generated.

18. The one or more non-transitory computer-accessible storage media as recited in claim 15, wherein a particular factor of the list of factors comprises a portion of an image which was present in a record for which a prediction of the plurality of predictions was generated.

19. The one or more non-transitory computer-accessible storage media as recited in claim 15, storing further program instructions that when executed on or across the one or more processors:
    present, via the one or more programmatic interfaces from the cloud computing environment, a candidate model enhancement action for the machine learning model; and
    perform the candidate model enhancement action at the cloud computing environment in response to input received via the one or more programmatic interfaces.

20. The one or more non-transitory computer-accessible storage media as recited in claim 15, storing further program instructions that when executed on or across the one or more processors:
    present, via the one or more programmatic interfaces from the cloud computing environment, a set of statistics pertaining to a particular attribute of records for which respective predictions of the subset were generated.

\* \* \* \* \*